(12) United States Patent
Labrou et al.

(10) Patent No.: US 7,606,560 B2
(45) Date of Patent: Oct. 20, 2009

(54) AUTHENTICATION SERVICES USING MOBILE DEVICE

(75) Inventors: Yannis Labrou, Baltimore, MD (US); Jonathan Russell Agre, Brinkley, MD (US)

(73) Assignee: Fujitsu Limited, Kawasaki (JP)

( * ) Notice: Subject to any disclaimer, the term of this patent is extended or adjusted under 35 U.S.C. 154(b) by 307 days.

(21) Appl. No.: 11/388,202

(22) Filed: Mar. 24, 2006

(65) Prior Publication Data

US 2006/0206709 A1    Sep. 14, 2006

Related U.S. Application Data

(63) Continuation-in-part of application No. 11/045,484, filed on Jan. 31, 2005, and a continuation-in-part of application No. 10/458,205, filed on Jun. 11, 2003, now Pat. No. 7,353,382, and a continuation-in-part of application No. 10/628,584, filed on Jul. 29, 2003, now Pat. No. 7,349,871, and a continuation-in-part of application No. 10/628,569, filed on Jul. 29, 2003, and a continuation-in-part of application No. 10/628,583, filed on Jul. 29, 2003.

(60) Provisional application No. 60/401,807, filed on Aug. 8, 2002, provisional application No. 60/669,375, filed on Apr. 8, 2005.

(51) Int. Cl.
*H04M 3/16* (2006.01)

(52) U.S. Cl. .............. 455/411; 455/410; 455/414.1; 705/50; 713/172

(58) Field of Classification Search ............... 455/411, 455/410, 414.1, 423, 67.11; 713/172; 705/50; 370/245, 328, 338; 709/224
See application file for complete search history.

(56) References Cited

U.S. PATENT DOCUMENTS

| 4,182,261 | A | 1/1980 | Smith, III et al. |
| 4,253,086 | A | 2/1981 | Szwarcbier |
| 4,458,109 | A | 7/1984 | Mueller-Schloer |
| 4,582,985 | A | 4/1986 | Lofberg |
| 4,636,622 | A | 1/1987 | Clark |
| 4,882,195 | A | 11/1989 | Butland |

(Continued)

FOREIGN PATENT DOCUMENTS

DE    103 10 527 A1    9/2004

(Continued)

OTHER PUBLICATIONS

Herschberg, Mark A., "Secure Electronic Voting Over the World Wide Web," Massachusetts Institute of Technology, May 27, 1997 (pp. 1-67).

(Continued)

*Primary Examiner*—Danh C Le
(74) *Attorney, Agent, or Firm*—Staas & Halsey LLP

(57) ABSTRACT

A method, and an apparatus performing the method, is provided by authenticating a mobile device communicably connectable to a wireless network by an authentication parameter from a secure transaction server (STS), as a mobile device authenticator; providing an STS correlation between a personal identification entry (PIE) and the mobile device authenticator; and inputting, by a user, the PIE and a provider action, to the mobile device authenticator to transmit a transformed secure user authenticable authorization request to the STS over the wireless network to authorize an action with a provider.

20 Claims, 13 Drawing Sheets

U.S. PATENT DOCUMENTS

| | | |
|---|---|---|
| 5,095,194 A | 3/1992 | Barbanell |
| 5,194,289 A | 3/1993 | Butland |
| 5,239,166 A | 8/1993 | Graves |
| 5,256,863 A | 10/1993 | Ferguson et al. |
| 5,363,453 A | 11/1994 | Gagne et al. |
| 5,465,328 A | 11/1995 | Dievendorff et al. |
| 5,485,312 A | 1/1996 | Horner et al. |
| 5,521,980 A | 5/1996 | Brands |
| 5,598,474 A | 1/1997 | Johnson |
| 5,631,961 A | 5/1997 | Mills et al. |
| 5,644,118 A | 7/1997 | Hayashida |
| 5,666,420 A | 9/1997 | Micali |
| 5,732,148 A | 3/1998 | Keagy et al. |
| 5,790,677 A | 8/1998 | Fox et al. |
| 5,794,204 A | 8/1998 | Walker et al. |
| 5,869,822 A | 2/1999 | Meadows, II et al. |
| 5,913,203 A | 6/1999 | Wong et al. |
| 5,917,168 A | 6/1999 | Nakamura et al. |
| 5,949,043 A | 9/1999 | Hayashida |
| 5,956,404 A | 9/1999 | Schneier et al. |
| 6,003,762 A | 12/1999 | Hayashida |
| 6,003,767 A | 12/1999 | Hayashida |
| 6,006,328 A | 12/1999 | Drake |
| 6,010,068 A | 1/2000 | Bozzo |
| 6,044,388 A | 3/2000 | DeBellis et al. |
| 6,067,621 A | 5/2000 | Yu et al. |
| 6,069,969 A | 5/2000 | Keagy et al. |
| 6,081,793 A | 6/2000 | Challener et al. |
| 6,098,053 A | 8/2000 | Slater |
| 6,115,601 A | 9/2000 | Ferreira |
| 6,137,884 A | 10/2000 | Micali |
| 6,163,771 A | 12/2000 | Walker et al. |
| 6,175,922 B1 | 1/2001 | Wang |
| 6,175,923 B1 | 1/2001 | Bailey |
| 6,182,892 B1 | 2/2001 | Angelo et al. |
| 6,199,099 B1 | 3/2001 | Gershman et al. |
| 6,212,290 B1 | 4/2001 | Gagne et al. |
| 6,226,752 B1 | 5/2001 | Gupta et al. |
| 6,257,487 B1 | 7/2001 | Hayashida |
| 6,263,436 B1 | 7/2001 | Franklin et al. |
| 6,270,011 B1 | 8/2001 | Gottfried |
| 6,334,575 B1 | 1/2002 | Su-Hui |
| 6,356,752 B1 | 3/2002 | Griffith |
| 6,366,893 B2 | 4/2002 | Hannula et al. |
| 6,377,692 B1 | 4/2002 | Takahashi et al. |
| 6,378,073 B1 | 4/2002 | Davis |
| 6,378,775 B2 | 4/2002 | Hayashida |
| 6,405,314 B1 | 6/2002 | Bailey |
| 6,435,406 B1 | 8/2002 | Pentel |
| 6,470,448 B1 | 10/2002 | Kuroda et al. |
| 6,512,919 B2 | 1/2003 | Ogasawara |
| 6,529,885 B1 | 3/2003 | Johnson |
| 6,556,875 B1 | 4/2003 | Nagasaka et al. |
| 6,587,684 B1 | 7/2003 | Hsu et al. |
| 6,598,032 B1 | 7/2003 | Challener et al. |
| 6,632,258 B1 | 10/2003 | Godoroja et al. |
| 6,687,375 B1 | 2/2004 | Matyas et al. |
| 6,715,679 B1 | 4/2004 | Infosino |
| 6,766,453 B1 | 7/2004 | Nessett et al. |
| 6,775,777 B2 | 8/2004 | Bailey |
| 6,817,521 B1 | 11/2004 | Matada |
| 6,874,029 B2 | 3/2005 | Hutcheson et al. |
| 6,915,951 B2 | 7/2005 | Hayashida |
| 6,926,200 B1 | 8/2005 | Hayashida |
| 6,931,431 B2 | 8/2005 | Cachin et al. |
| 6,957,334 B1 | 10/2005 | Goldstein et al. |
| 7,003,499 B2 | 2/2006 | Arditti et al. |
| 7,025,256 B1 | 4/2006 | Drummond et al. |
| 7,099,471 B2 | 8/2006 | Neff |
| 7,167,844 B1 | 1/2007 | Leong et al. |
| 7,181,017 B1 | 2/2007 | Nagel |
| 7,200,749 B2 | 4/2007 | Wheeler et al. |
| 7,239,346 B1 | 7/2007 | Priddy |
| 7,379,916 B1 | 5/2008 | Mizrah |
| 2001/0004231 A1 | 6/2001 | Bailey |
| 2001/0005840 A1 | 6/2001 | Verkama |
| 2001/0010723 A1 | 8/2001 | Pinkas |
| 2001/0034670 A1 | 10/2001 | Blair |
| 2001/0037254 A1 | 11/2001 | Glikman |
| 2001/0037264 A1 | 11/2001 | Husemann et al. |
| 2001/0045458 A1 | 11/2001 | Polansky |
| 2001/0053239 A1 | 12/2001 | Takhar |
| 2002/0017561 A1 | 2/2002 | Tomoike |
| 2002/0018585 A1 | 2/2002 | Kim |
| 2002/0052841 A1 | 5/2002 | Guthrie et al. |
| 2002/0057803 A1 | 5/2002 | Loos et al. |
| 2002/0073024 A1 | 6/2002 | Gilchrist |
| 2002/0077885 A1 | 6/2002 | Karro et al. |
| 2002/0077974 A1 | 6/2002 | Ortiz |
| 2002/0077993 A1 | 6/2002 | Immonen et al. |
| 2002/0082925 A1 | 6/2002 | Herwig |
| 2002/0087534 A1 | 7/2002 | Blackman et al. |
| 2002/0087869 A1 | 7/2002 | Kim |
| 2002/0095296 A1 | 7/2002 | Hind et al. |
| 2002/0095570 A1* | 7/2002 | Eldridge et al. ............. 713/155 |
| 2002/0097867 A1 | 7/2002 | Bartram |
| 2002/0107007 A1 | 8/2002 | Gerson |
| 2002/0107791 A1 | 8/2002 | Nobrega |
| 2002/0107939 A1 | 8/2002 | Ford et al. |
| 2002/0141575 A1 | 10/2002 | Hird |
| 2002/0163421 A1 | 11/2002 | Wang et al. |
| 2002/0176579 A1 | 11/2002 | Deshpande et al. |
| 2002/0196944 A1 | 12/2002 | Davis et al. |
| 2003/0046541 A1* | 3/2003 | Gerdes et al. ............... 713/168 |
| 2003/0061486 A1 | 3/2003 | Shibuya et al. |
| 2003/0123667 A1 | 7/2003 | Weber et al. |
| 2003/0174049 A1 | 9/2003 | Beigel et al. |
| 2003/0190046 A1 | 10/2003 | Kamerman et al. |
| 2003/0204726 A1* | 10/2003 | Kefford et al. ............... 713/171 |
| 2003/0226030 A1 | 12/2003 | Hurst et al. |
| 2004/0030894 A1 | 2/2004 | Labrou et al. |
| 2004/0104268 A1 | 6/2004 | Bailey |
| 2004/0123098 A1 | 6/2004 | Chen |
| 2004/0123159 A1 | 6/2004 | Kerstens et al. |
| 2004/0151323 A1 | 8/2004 | Olkin et al. |
| 2004/0158492 A1 | 8/2004 | Lopez et al. |
| 2004/0234117 A1 | 11/2004 | Tibor |
| 2005/0122209 A1 | 6/2005 | Black |
| 2005/0194452 A1 | 9/2005 | Nordentoft et al. |
| 2006/0229988 A1 | 10/2006 | Oshima et al. |
| 2006/0266823 A1 | 11/2006 | Passen et al. |

FOREIGN PATENT DOCUMENTS

| | | |
|---|---|---|
| EP | 0950968 | 2/1999 |
| EP | 0 982 674 A2 | 3/2000 |
| EP | 1 120 761 A2 | 8/2001 |
| EP | 1 178 444 A1 | 2/2002 |
| EP | 1 231 578 A2 | 8/2002 |
| EP | 1 237 132 A2 | 9/2002 |
| EP | 1 237 133 A2 | 9/2002 |
| EP | 1 237 134 A2 | 9/2002 |
| EP | 1 388 797 A2 | 2/2004 |
| GB | 2 386 236 | 9/2003 |
| JP | 2000-207483 | 7/2000 |
| JP | 2000-269957 | 9/2000 |
| JP | 2002-259621 | 9/2002 |
| KR | 2000-0068758 | 11/2000 |
| WO | WO 97/41932 | 11/1997 |
| WO | WO 97/45814 | 12/1997 |
| WO | WO 98/25371 | 6/1998 |
| WO | WO 98/37524 | 8/1998 |
| WO | WO 00/46959 | 8/2000 |
| WO | WO 01/01361 | 1/2001 |

| | | |
|---|---|---|
| WO | WO 01-35570 | 5/2001 |
| WO | WO 01/80133 | 10/2001 |
| WO | WO 01/98854 | 12/2001 |
| WO | WO 02/07117 | 1/2002 |
| WO | WO 02/11082 | 2/2002 |
| WO | WO 02/13151 | 2/2002 |
| WO | WO 02/27421 | 4/2002 |
| WO | WO 02/27439 | 4/2002 |
| WO | WO 02/29708 | 4/2002 |
| WO | WO 02/29739 | 4/2002 |
| WO | WO02/41271 | 5/2002 |
| WO | WO 02/43020 | 5/2002 |
| WO | WO 02/054655 | 7/2002 |
| WO | WO 02-59849 | 8/2002 |
| WO | WO 02/067534 | 8/2002 |

OTHER PUBLICATIONS

Jan et al., "The Design of Protocol for e-Voting on the Internet." IEEE, Oct. 2001 (pp. 180-189).

Jan, Jinn-ke et al. "A secure anonymous voting protocol with a complete supervision." Computer Systems Science & Engineering, vol. 17, Nos. (4/5): Jul./Sep. 2002 (pp. 213-221).

Juang, Wen-Sheng et al. "A Verifiable Multi-Authorities Secret Election Allowing Abstaining from Voting." International Computer Symposium, Tainan, Taiwan, 1998 (pp. 1-21).

Menezes, Alfred J., et al., "Handbook of Applied Cryptography", 1997 CRC Press LLC, Section 1.5 Symmetric-key encryption (9 pages).

Asthana, Abhaya, et al., An Indoor Wireless System for Personalized Shopping Assistance (1994) [online]. IEEE Workshop on Mobile Computing Systems and Applications (1 page) [retrieved on Aug. 2, 2002]. Retrieved from the Internet: <URL: http://www.nerac.com>.

European Search Report Communication issued by the European Patent Office on Nov. 15, 2007 in the related European Patent Application No. 03254926.3—1244 (3 pages).

Korean Office Action issued by the Korean Intellectual Property Office on Nov. 8, 2007 in related Korean Patent Application No. 10-2006-7019071 based upon PCT/US2005/004049 (4 pages) (English translation consisting of 4 pages).

Deborah Bach, "CIBC Makes Long-Term Case for Wireless" [online], American Banker, vol. 167, No. 65, Apr. 5, 2002 (2 pages) [retrieved on Aug. 2, 2002]. Retrieved from the Internet: <URL: http://www.nerac.com>.

"WAWA Installs Wireless Card Processing" [online], CardLine, 2001 (1 page) [retrieved on Aug. 2, 2002]. Retrieved from the Internet: <URL: http://www.nerac.com>.

Jennifer A. Kingson, "First Data Sets Strategy for Wireless" [online], American Banker, vol. 167, No. 17, Jan. 25, 2002 (3 pages) [retrieved on Aug. 2, 2002]. Retrieved from the Internet: <URL: http://www.nerac.com>.

"Thirsty? Soon you may be able to charge and chug" [online], USA Today, Dec. 21, 2001, p. 7B (1 pages) [retrieved on Aug. 2, 2002]. Retrieved from the Internet: <URL: http://www.nerac.com>.

M. Giometti, et al., "Creating Winning M-Commerce Models in the Financial Services" [online], FutureBanker, vol. 5, No. 10, Dec. 2001, p. 37 (2 pages) [retrieved on Aug. 2, 2002]. Retrieved from the Internet: <URL: http://www.nerac.com>.

"Hongkong Post Launches Mobile e-Certs" [online], Online Reporter, Oct. 22, 2001 (2 page) [retrieved on Aug. 2, 2002]. Retrieved from the Internet: <URL: http://www.nerac.com>.

"Wallet and WIM pilot" [online], Mobile Europe, Oct. 2001, p. 16 (1 page) [retrieved on Aug. 2, 2002]. Retrieved from the Internet: <URL: http://www.nerac.com>.

"Regional News: Asia/Pacific: DoCoMo, Sony Use E-Purse, PDAs in Mobile Commerce Trial" [online]. Card Technology, vol. 2, No. 10, Oct. 2001 (1 page) [retrieved on Aug. 2, 2002]. Retrieved from the Internet: <URL: http://www.nerac.com>.

"Wildcard Sure Mobile Pizza Pilot Will Deliver" [online]. CardLine, Oct. 2001 (1 page) [retrieved on Aug. 2, 2002]. Retrieved from the Internet: <URL: http://www.nerac.com>.

Varshney, Upkar, et al., "Mobile commerce: Framework, applications and networking support" [online]. Mobile Networks Appl., vol. 7, No. 3, Jun. 2002, pp. 185-198 (1 page) [retrieved on Aug. 2, 2002]. Retrieved from the Internet: <URL: http://www.nerac.com>.

Friis-Hansen, et al., "Secure electronic transactions—The mobile phone evolution continues" [online]. Ericsson Rev. (Engl. Ed); vol. 78, No. 4, 2001, pp. 162-167(1 page) [retrieved on Aug. 2, 2002]. Retrieved from the Internet: <URL: http://www.nerac.com>.

Bettstetter, Christian, et al., "(Auto) mobile communication in a heterogeneous and converged world" [online]. IEEE Pers Commun., vol. 8, No. 6, Dec. 2001, pp. 41-47 (1 page) [retrieved on Aug. 2, 2002]. Retrieved from the Internet: <URL: http://www.nerac.com>.

Gupta, S., "Securing the wireless internet" [online]. IEEE Commun. Mag., vol. 39, No. 12, Dec. 2001, pp. 68-75 (1 page) [retrieved on Aug. 2, 2002]. Retrieved from the Internet: <URL: http://www.nerac.com>.

Aalders, K., "Travel card: Airport self-check in using a wireless PDA" [online]. IEEE Conf. Intell Transport Syst Proc ITSC, 2001, pp. 1224-1228 (1 page) [retrieved on Aug. 2, 2002]. Retrieved from the Internet: <URL: http://www.nerac.com>.

Brananaghan, R.J., "Human factors issues in the design of handheld wireless devices" [online]. Proc SPIE Int Soc Opt Eng, vol. 4428, 2001, pp. 37-41 (1 page) [retrieved on Aug. 2, 2002]. Retrieved from the Internet: <URL: http://www.nerac.com>.

Cohn, Michael, Like money in your hand: Wireless technology lets financial firms quickly deliver transactions and trades. (Financial Services) [online]. Internet World, vol. 8, No. 5, May 1, 2002, pp. 54(3) (4 pages). [retrieved on Aug. 2, 2002]. Retrieved from the Internet: <URL: http://www.nerac.com>.

Ray Cammack Shows. (M&S News). (to use wireless credit card terminals) (Brief Article) [online]. Amusement Business, vol. 114, No. 17, Apr. 29, 2002, pp. 4(1) (1 page) [retrieved on Aug. 2, 2002]. Retrieved from the Internet: <URL: http://www.nerac.com>.

Kabaher, April, MasterCard snags citi exec for new wireless role. (Brief Article) [online]. Financial Net News, vol. 7, No. 14, Apr. 8, 2002, pp. 1(2) (1 page) [retrieved on Aug. 2, 2002]. Retrieved from the Internet: <URL: http://www.nerac.com>.

"Pepsi North America tests wireless vending in Memphis" [online]. Automatic Merchandiser, vol. 44, No. 2, Feb. 1, 2002, pp. 9(1) (1 page) [retrieved on Aug. 2, 2002]. Retrieved from the Internet: <URL: http://www.nerac.com>.

Radding, Alan, "Crossing the Wireless Security Gap." [online]. Computerworld, Jan. 1, 2001 (3 pages) [retrieved on Aug. 2, 2002]. Retrieved from the Internet: <URL: http://www.nerac.com>.

Commerciant inks wireless deal. (EDS will provide transaction processing services for Commerciant's wireless terminals) (Brief Article) [online]. Houston Business Journal, vol. 32, No. 23, Oct. 19, 2001 (1 page) [retrieved on Aug. 2, 2002]. Retrieved from the Internet: <URL: http://www.nerac.com>.

"Wireless in Boston (Fleet HomeLink offers services through personal digital assistants) (Brief Article)" [online]. Bank Marketing, vol. 33, No. 7, Sep. 1, 2001 (1 page) [retrieved on Aug. 2, 2002]. Retrieved from the Internet: <URL: http://www.nerac.com>.

Murphy, Patricia A., Wireless payment technology spreads from gas pump to store. (VeriFone system) [online]. Stores, vol. 83, No. 5, May 1, 2001, pp. 74(2) (1 page) [retrieved on Aug. 2, 2002]. Retrieved from the Internet: <URL: http://www.nerac.com>.

Hoffman, Karen Epper, New Options in Wireless Payments. (Company Business and Marketing) [online]. Internet World, vol. 7, No. 7, Apr. 1, 2001, pp. 37 (4 pages) [retrieved on Aug. 2, 2002]. Retrieved from the Internet: <URL: http://www.nerac.com>.

Khachtchanski, V.I., et al., "Universal SIM toolkit-based client for mobile authorization system" [online]. Third International Conference on Information Integration and Web-based Applications and Services, 2001, pp. 337-344 (1 page) [retrieved on Aug. 2, 2002]. Retrieved from the Internet: <URL: http://www.nerac.com>.

"CIBC kicks off wireless banking service" [online]. Bank Systems + Technology, vol. 39, No. 5, May 2002, p. 12 (1 page) [retrieved on Aug. 2, 2002]. Retrieved from the Internet: <URL: http://www.nerac.com>.

Asthana, Abhaya, et al., An Indoor Wireless System for Personalized Shopping Assistance (1994) [online]. IEEE Workshop on Mobile Computing Systems and Applications (1 page) [retrieved on Aug. 2, 2002]. Retrieved from the Internet: <URL: http://www.nerac.com>.

Electronic payment systems, involving mobile phones (list of e-products, 15 listings), [online] Electronic Payment System Observatory (the ePSO website aims to monitor the progress of retail payment innovation throughout Europe, ePSO inventory of E-Payment services—List of e-products) (26 pages). European Central Bank, Frankfurt, Germany, 2002 [retrieved September 11, 2002]. Retrieved from the Internet: <http://epso.intrasoft.lu>,.

Yannis Labrou, et al., "Wireless Wallet", Proceedings of the First Annual International Conference on Mobile and Ubiquitous Systems: Networking and Services (MobiQuitous '04); ISBN: 0-7695-2208-4, IEEE, Aug. 22, 2004.

Mobile, Academic Press Dictionary of Science and Technology, xreferplus (1992); <URL: http://xreferplus.com/entry.jsp?xrefid=3130947&secid=.&hh=1>, 1 page.

Purchase, 1996, Merriam-Webster's Dictionary of Law, <URL: http://dictionary.reference.com/browse/purchase>, p. 4.

U.S. Appl. No. 60/401,807, filed Aug. 8, 2002, Yannis Labrou, et al., Fujitsu Limited Kawasaki, Japan.

U.S. Appl. No. 10/458,205, filed Jun. 11, 2003, Yannis Labrou, et al., Fujitsu Limited Kawasaki, Japan.

U.S. Appl. No. 10/628,584, filed Jul. 29, 2003, Yannis Labrou, et al., Fujitsu Limited Kawasaki, Japan.

U.S. Appl. No. 10/628,569, filed Jul. 29, 2003, Yannis Labrou, et al., Fujitsu Limited Kawasaki, Japan.

U.S. Appl. No. 10/628,583, filed Jul. 29, 2003, Yannis Labrou, et al., Fujitsu Limited Kawasaki, Japan.

U.S. Appl. No. 60/544,300, filed Feb. 17, 2004, Yannis Labrou, et al., Fujitsu Limited Kawasaki, Japan.

U.S. Appl. No. 60/669,375, filed Apr. 8, 2005, Yannis Labrou, et al., Fujitsu Limited Kawasaki, Japan.

U.S. Appl. No. 11/045,484, filed Jan. 31, 2005, Yannis Labrou, et al., Fujitsu Limited Kawasaki, Japan.

U.S. Appl. No. 60/703,862, filed Aug. 1, 2005, Yannis Labrou, et al., Fujitsu Limited Kawasaki, Japan.

U.S. Appl. No. 11/041,223, filed Jan. 25, 2005, Yannis Labrou, et al., Fujitsu Limited Kawasaki, Japan.

U.S. Appl. No. 11/488,178, filed Jul. 18, 2006, Yannis Labrou, et al., Fujitsu Limited Kawasaki, Japan.

U.S. Appl. No. 60/541,903, filed Feb. 6, 2004, Yannis Labrou, et al., Fujitsu Limited Kawasaki, Japan.

U.S. Appl. No. 60/549,148, filed Mar. 3, 2004, Yannis Labrou, et al., Fujitsu Limited Kawasaki, Japan.

U.S. Appl. No. 60/575,835, filed Jun. 2, 2004, Yannis Labrou, et al., Fujitsu Limited Kawasaki, Japan.

PCT International Search Report dated Oct. 4, 2005 for International Application No. PCT/US05/04049 related to the above-identified present pending US patent application (2 pages).

Form PCT/ISA/237—Written Opinion of the International Searching Authority dated Oct. 4, 2005 in International Application No. PCT/US05/04049 related to the above-identified present pending US patent application (3 pages).

International Preliminary Report on Patentability (Chapter I of the Patent Cooperation Treaty) dated Aug. 22, 2006 in International Application No. PCT/US05/04049 related to the above-identified present pending US patent application (5 pages).

European Communication Pursuant to Article 96(2) EPC dated Jul. 26, 2005 in European Application No. 03 254 927.1—1238, related to the above-identified ,present pending US patent application (6 pages).

European Search Report Communication issued by the European Patent Office on Aug. 30, 2004 in European Application No. 03254927.1-1238 related to the above-identified present pending US patent application (3 pages).

European Search Report Communication issued by the European Patent Office on Jan. 8, 2007 in Application No. 06253923.4—1238 related to the above-identified present pending US patent application (13 pages).

Nerac (Patents, Intellectual Property, Research), [online]. Nerac, Inc. Tolland CT, USA, 4 pages [retrieved Dec. 18, 2006]. Retrieved from the Internet: <URL: http://www.nerac.com>.

MeT Mobile electronic Transactions (MeT limited is a company founded to establish a framework for secure mobile transactions) [online]. Mobile electronic Transactions Limited, 2003, 3 pages [retrieved Jan. 5, 2005]. Retrieved from the Internet: <URL: http://www.mobiletransaction.org>.

Two-Factor Token Matrix [online]. Diversinet Corp., 2 pages [retrieved on Mar. 24, 2006]. Retrieved from the Internet: <URL: http://www.diversinet.com/>.

Diversinet Delivers Consumer-Ready Soft Token Strong Authentication Solution [online]. Diversinet Corp., Feb. 7, 2006, 2 pages [retrieved on Dec. 27, 2006]. Retrieved from the Internet: <URL: http://www.diversinet.com/html/press/2006/consumer.html>.

Labrou, Yannis, 'Re: Mobile payments with a downloadable application from PayWi (referencing "PayWi Powers Personal Payments in Your Palm," PRNewsWire, Portland Oregon, Feb. 6, 2006) [online]. Feb. 21, 2006 (4 pages) [retrieved Mar. 24, 2006]. Retrieved from the Internet: <URL: http://uptf.blogspot.com/2006/02/mobile-payments-with-downloadable.html>.

Labrou, Yannis. UPTF blog (a blog for Wireless Wallet) [online] 22 pages [retrieved Dec. 27, 2006] Retrieved from the Internet: <URL: http://uptf.blogspot.com>.

Electronic Payment System Observatory (the ePSO website aims to monitor the progress of retail payment innovation throughout Europe, ePSO inventory of E-Payment services—List of e-products) [online]. European Central Bank, Frankfurt, Germany (3 pages) [retrieved Dec. 18, 2006]. Retrieved from the Internet: <URL: http://epso.intrasoft.lu>.

"Via Licensing Begins Process to Form Wireless Networking Patent Licensing Pool" [online]. Via Licensing Corporation, Oct. 23, 2003, 3 pages [retrieved Nov. 17, 2003]. Retrieved from the Internet: <URL: http://www.vialicensing.com/news/details.cfm1?VIANEWS_ID=308>.

Labrou, Yannis, 'Re: Motorola's M-Wallet: Mobile payments with a J2ME application' (referencing "Motorola M-Wallet Solution" brochure Motorola, Inc. 2006) in UPTF blog for Wireless Wallet [online], Feb. 21, 2006, 5 pages [retrieved Mar. 24, 2006]. Retrieved from the Internet: <URL: http://uptf.blogspot.com/2006/02/mobile-payment-with-downloadable.html>.

IEEE Standards Association (IEEE Std 802.11 and amendments) (802.11 patent information) [online]. IEEE-SA, 19 pages [retrieved Dec. 27, 2006]. Retrieved from the Internet: <URL: http://standards.ieee.org/db/patents/pat802_11.html>.

European Search Report Communication issued by the European Patent Office on Apr. 23, 2007 in Application No. 06251957.4—1244 related to the above-identified present pending US patent application (9 pages).

Steves, Douglas "Overview on Secure Transaction Protocols" <URL: http://www.usenix.org/publications/library/proceedins/ec96/full_papers/steves/html/node5.html#SECTION00021000000000000>, May 4, 1997 (1 page article).

European Communication Pursuant to Article 94(3) EPC dated May 19, 2009 in European Application No. 03 254 926.3 -2413, which corresponds to related US patent No. 7,353,382 from which the present application claims priority as a continuation-in-part (7 pages).

U.S. Office Action mailed Apr. 2, 2009 in co-pending parent U.S. Appl. No. 10/628,569 (19 pages).

U.S. Office Action mailed Mar. 16, 2009 in co-pending parent U.S. Appl. No. 10/629,583 (21 pages).

U.S. Office Action mailed Apr. 2, 2009 in co-pending parent U.S. Appl. No. 11/041,223 (20 pages).

U.S. Office Action mailed Apr. 13, 2009 in co-pending parent U.S. Appl. No. 11/045,484 (28 pages).

Written Decision of the Examining Division refusing patent application dated Apr. 28, 2009 in a related European Application No. 03254927.1- 1238, which corresponds to related US patent No. 7,349,821 from which the present application claims priority as a continuation-in-part (14 pages).

Japanese Office Action Mailed Jul. 14, 2009 issued in related Japanese Application No. 2006-554126. (6 pages) (translation 5 pages).

U.S. Office Action mailed Aug. 31, 2009 in co-pending related U.S. Appl. No. 10/628,583 (16 pages).

U.S. Office Action mailed May 3, 2007 in co-pending U.S. Appl. No. 10/628,569 (11 pages)

U.S. Office Action mailed Oct. 19, 2007 in co-pending U.S. Appl. No. 10/628,569 (10 pages).
U.S. Advisory Action mailed Feb. 28, 2008 in co-pending U.S. Appl. No. 10/628,569 (3 pages).
U.S. Office Action mailed Jun. 26, 2008 in co-pending U.S. Appl. 10/628,569 (15 pages).
U.S. Interview Summary mailed Oct. 14, 2008 in co-pending U.S. Appl. No. 10/628,569 (2 pages).
U.S. Office Action mailed Sep. 27, 2006 in co-pending U.S. Appl. No. 10/628,584 (now U.S. Patent No. 7,349,871) (16 pages).
U.S. Office Action mailed Apr. 19, 2007 in co-pending U.S. Appl. No. 10/628,584 (now U.S. Patent No. 7, 349,871) (21 pages).
U.S. NOA mailed Oct. 1, 2007 in co-pending U.S. Appl. No. 10/628,584 (now U.S. Patent No. 7, 349,871) (35 pages).
U.S. Supplemental Notice of Allowability mailed Jan. 9, 2008 in co-pending U.S. Appl. No. 10/628,584 (now U.S. Patent No. 7, 349,871) (12 pages).
U.S. Response to Rule 312 Communication mailed Feb. 12, 2008 in co-pending U.S. Appl. No. 10/628,584 (now U.S. Patent No. 7, 349,871) (7 pages).
U.S. Office Action mailed Mar. 5, 2008 in co-pending related U.S. Appl. No. 11/041,223 (14 pages).
U.S. Office Action mailed Oct. 17, 2008 in co-pending related U.S. Appl. No. 11/041,223 (20 pages).
U.S. Office Action mailed Jan. 5, 2007 in co-pending related U.S. Appl. No. 10/458,205 (now U.S. Patent No. 7,353,382) (11 pages).
U.S. Office Action mailed May 22, 2007 in co-pending U.S. Appl. No. 10/458,205 (now U.S. Patent No. 7,353,382) (12 pages).
U.S. NOA mailed Oct. 29, 2007 in co-pending related U.S. Appl. No. 10/458,205 (now U.S. Patent No. 7,353,382) (9 pages).
U.S. Office Action mailed Mar. 8, 2007 in co-pending related U.S. Appl. No. 10/628,583 (29 pages).
U.S. Office Action mailed Dec. 27, 2007 in co-pending related U.S. Appl. No. 10/628,583 (49 pages).
U.S. Advisory Action mailed Apr. 17, 2008 in co-pending related U.S. Appl. No. 10/628,583 (8 pages).
U.S. Office Action mailed Jul. 2, 2008 in co-pending related U.S. Appl. No. 10/628,583 (18 pages).
U.S. Interview Summary mailed Oct. 8, 2008 in co-pending related U.S. Appl. No. 10/628,583 (18 pages).
U.S. Office Action mailed Nov. 21, 2008 in co-pending related U.S. Appl. No. 11/045,484 (24 pages).
U.S. Office Action mailed Jun. 25, 2008 in co-pending related U.S. Appl. No. 11/045,484 (22 pages).

* cited by examiner

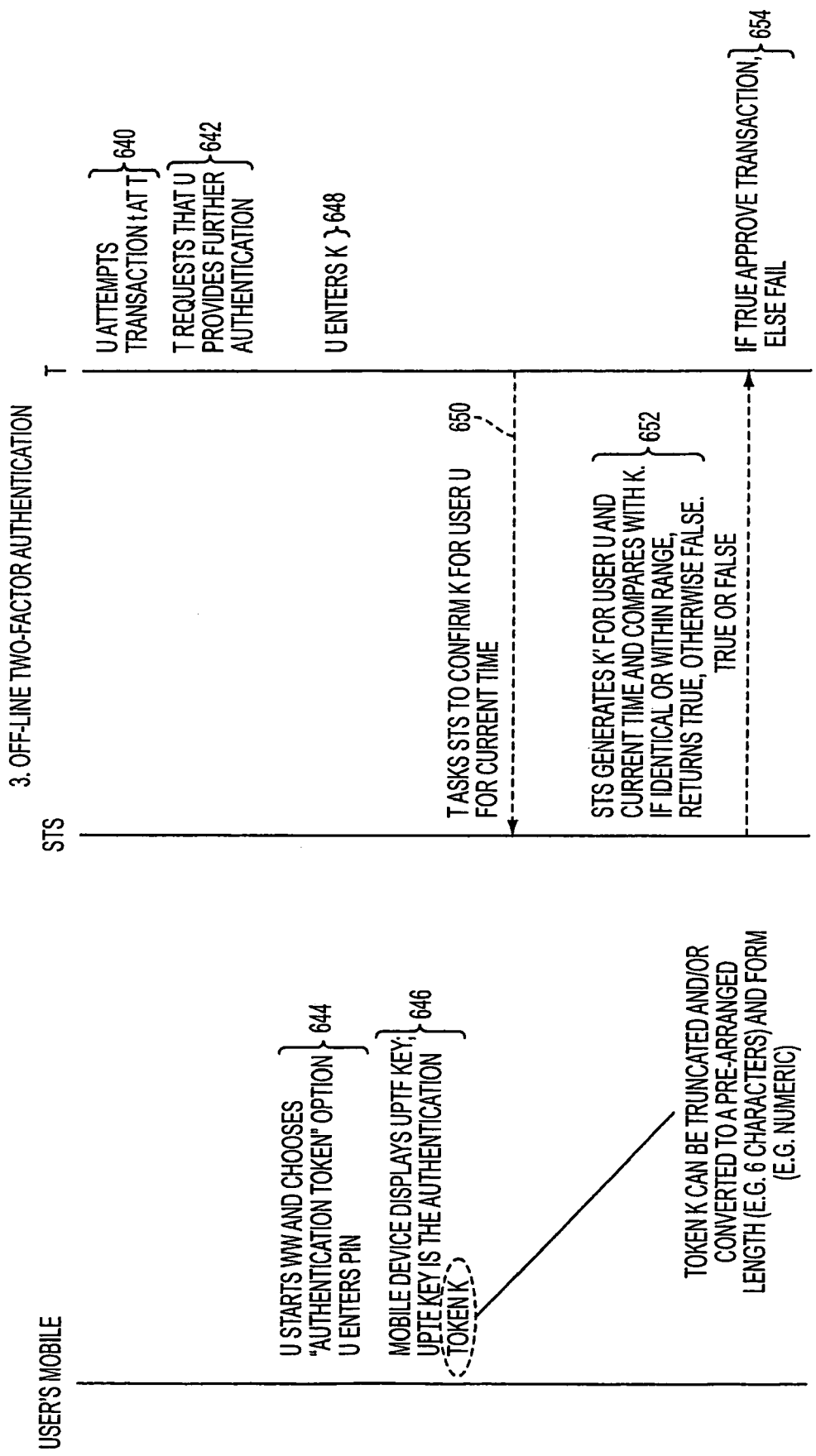

AUTHENTICATION SERVICES USING MOBILE DEVICE

CROSS-REFERENCE TO RELATED APPLICATIONS

This application claims the benefit of priority to U.S. Provisional Application Ser. No. 60/669,375, entitled TWO-FACTOR AUTHENTICATION WITH THE UNIVERSAL PERVASIVE TRANSACTION FRAMEWORK, by Yannis Labrou and Jonathan Agre, filed Apr. 8, 2005 in the U.S. Patent and Trademark Office, the contents of which is incorporated herein by reference.

This application is a continuation-in-part of U.S. patent application Ser. No. 11/045,484, filed Jan. 31, 2005, entitled "WIRELESS WALLET," and also a continuation-in-part of U.S. application Ser. No. 10/458,205, filed Jun. 11, 2003, now U.S. Pat. No. 7,353,382 which claims the benefit of U.S. provisional application No. 60/401,807, filed Aug. 8, 2002; and also a continuation-in-part of U.S. application Ser. No. 10/628,584 filed Jul. 29, 2003, now U.S. Pat. No. 7,349,871 which claims the benefit of U.S. provisional application No. 60/401,807 filed Aug. 8, 2002; and also a continuation-in-part of U.S. application Ser. No. 10/628,569 filed Jul. 29, 2003, which claims the benefit of U.S. provisional application No. 60/401,807 filed Aug. 8, 2002; and also a continuation-in-part of U.S. application Ser. No. 10/628,583 filed Jul. 29, 2003, which claims the benefit of U.S. provisional application No. 60/401,807 filed Aug. 8, 2002.

This application is related to pending U.S. patent application Ser. No. 10/458,205, filed Jun. 11, 2003; Ser. No. 10/628,584, filed Jul. 29, 2003; Ser. No. 10/628,569, filed Jul. 29, 2003; Ser. No. 10/628,583, filed Jul. 29, 2003; and Ser. No. 11/045,484, filed Jan. 31, 2005, the entire disclosures of all of which are hereby incorporated herein by reference.

BACKGROUND OF THE INVENTION

1. Field of the Invention

The present invention relates to a wireless apparatus or computing device as an authenticator. For example, a mobile phone user authenticator.

2. Description of the Related Art

Two-factor authentication is a security process in which a user provides two types or means of identification, one of which is typically a physical token, such as a card, and the other of which is typically something memorized, such as a security code. In this context, the two factors involved are sometimes spoken of or referred to as something a user has and something a user knows. A common example of two-factor authentication is a bank card: the card itself is the physical item and the personal identification number (PIN) is the known data, as a second factor, that goes with the bank card.

Hardware token generators can be used for $2^{nd}$ factor authentication to enterprise systems. However, a hardware token generator only generates a token to be used by a user or a holder of the hardware token generator to manually supply the token for authentication. For example, a two factor authentication can require that the second factor be a "physical token," i.e., something the user has, that can produce (i.e., display) the second factor token (such as a numeric string) that the holder of the "physical token" can enter at a terminal providing access to a sought service. However, a drawback of a hardware token generator is that a lost or stolen hardware token generator can be used to breach security or for fraud. Another drawback is requiring a user to manage an additional physical token for authentication purposes. Another drawback is multiple hardware token generators are needed for multiple authentications to different systems. Also, a hardware token generator does not adequately prevent phishing, because a two-factor authentication using a hardware token generator as the second factor is still susceptible to "man in the middle" type attacks.

Accordingly, there is a need to more securely and efficiently authenticate a user.

SUMMARY OF THE INVENTION

The present invention relates to a wireless apparatus or a wireless computing device as an authenticator. For example, a mobile phone user authenticator.

A method, and an apparatus performing the method, is provided by authenticating a mobile device communicably connectable to a wireless network by an authentication parameter from a secure transaction server (STS), as a mobile device authenticator; providing an STS correlation between a personal identification entry (PIE) and the mobile device authenticator; and inputting, by a user, the PIE and a provider action, to the mobile device authenticator to transmit a transformed secure user authenticable authorization request to the STS over the wireless network to authorize an action with a provider.

An apparatus by providing a provider system; a secure transaction server; and an authentic wireless communicator, based upon an authentication parameter from the secure transaction server (STS), to control the wireless communicator according to a process of receiving a personal identification entry (PIE) of a user and a provider action, and wirelessly transmitting a transformed secure user authenticable authorization request to the STS to authorize an action with the provider system. An apparatus, having a provider system; a secure transaction server; and means for receiving a personal identification entry (PIE) of a user and a provider system action, and wirelessly transmitting a transformed secure user authenticable authorization request to the STS to authorize the action with the provider system.

The above as well as additional aspects and advantages will be set forth in part in the description which follows and, in part, will be obvious from the description, or may be learned by practice of the described embodiments.

BRIEF DESCRIPTION OF THE DRAWINGS

The above-described aspects and advantages together with other aspects and advantages will become apparent and more readily appreciated from the following description of the embodiments, taken in conjunction with the accompanying drawings of which:

FIG. 6C is a system flow diagram for a mobile device off-line (off wireless network) two-factor user transaction authentication, according to an embodiment of the present invention.

DETAILED DESCRIPTION OF THE PREFERRED EMBODIMENTS

Figure 1:
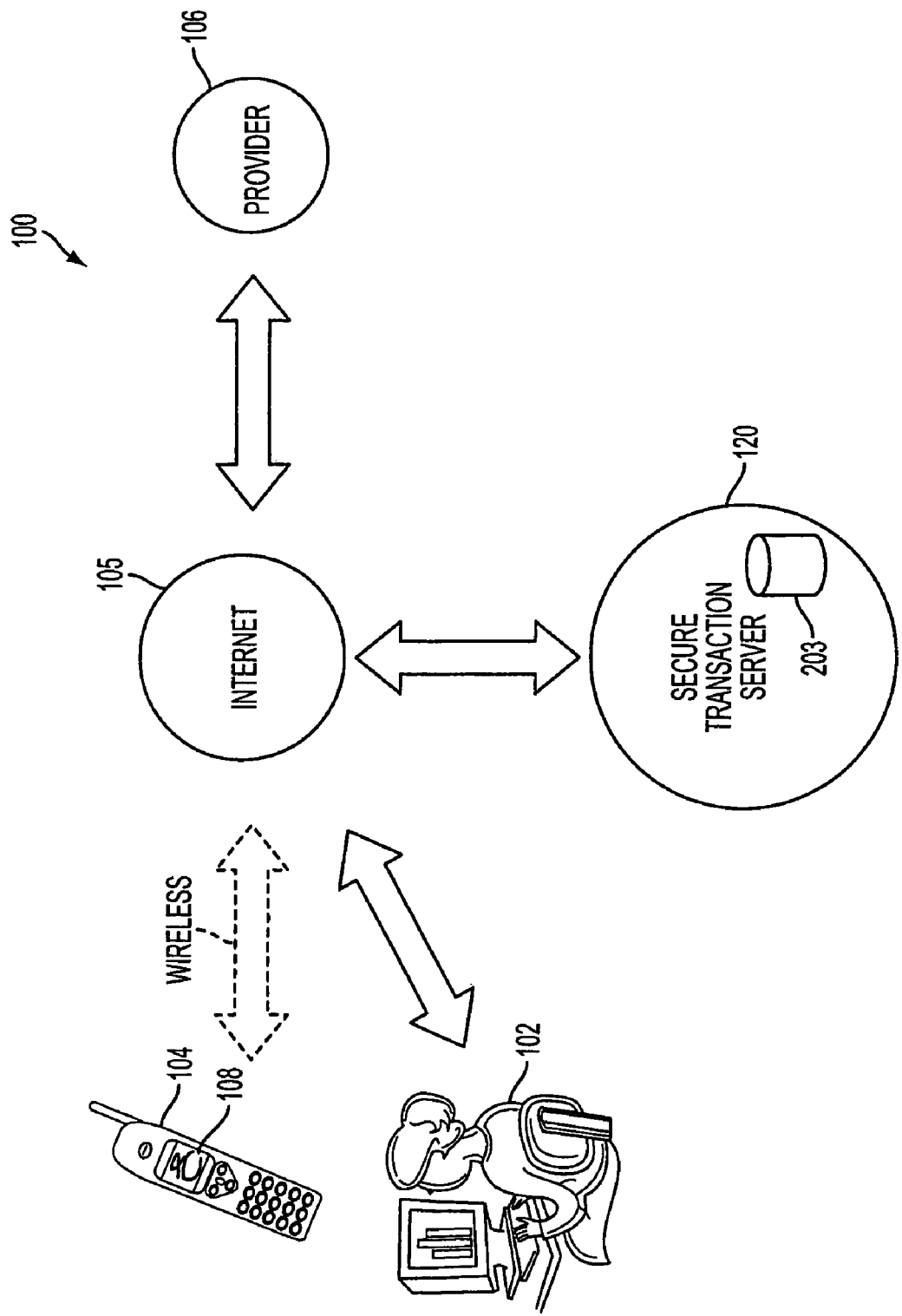
FIG. 1 is a diagram of a computer system to provide mobile device authentication services, according to an embodiment of the present invention.

Reference will now be made in detail to the present embodiments of the present invention, examples of which are illustrated in the accompanying drawings, wherein like reference numerals refer to the like elements throughout. The embodiments are described below to explain the present invention by referring to the figures.

The future ubiquitous computing environment will consist of users with wireless information computing apparatuses (mobile devices), such as cellular phones or Personal Digital Assistants (PDA's), that wirelessly communicate and interact with varied services and devices encountered at any particular moment and place. A crucial enabler for ubiquitous computing to emerge into the marketplace is the ability to safely or securely and efficiently conduct transactions.

For example, on the Internet, "phishing" (sometimes called carding or brand spoofing) is a scam where the perpetrator sends out legitimate-looking e-mails appearing to come from a legitimate source, for example, from a bank or some of the Web's biggest sites, including EBAY, PAYPAL, MSN, YAHOO, BESTBUY, and AMERICA ONLINE, in an effort to "phish" (pronounced "fish") for personal and financial information from the recipient of the illegitimate email.

The described embodiments provide authentication services, namely authentication services to access a physical environment (a place), such as without limitation, a computer system, a building, etc. According to the embodiments, "access" refers to authorized access to a restricted physical environment, including, for example, (without limitation) a computer system. According to the embodiments, "provider" refers to a provider place. The embodiments provide an authentication service for any pervasive computing environment transaction, such as an access transaction, payments, money transfers, etc., that requires additional authentication for increased security or an improvement over currently available authentication. For example, an authentication service for a transaction initiated at a website, such as a login transaction to access a computer system or payment transaction for a purchase via the website, as a single-factor or a two-factor transaction authentication. Two-factor authentication requires a second factor to authenticate a transaction, for example, in a situation where owner of a website suspects fraud, such as when a third party has stolen identity of a legitimate user of the website, for example, via Phishing, and the third party attempts a transaction (e.g., a login, a payment, a transfer of money, etc.) by impersonating the legitimate user.

FIG. 1 is a diagram of a computer system 100 to provide mobile device authentication services, according to an embodiment of the present invention. In the embodiments described herein, a user 102 uses a mobile wireless device 104 for authentication. The mobile wireless device 104 is any mobile wireless computing device or mobile radio computing device, including, without limitation, a mobile phone, that wirelessly communicates (e.g., wireless Internet 105 or mobile phone network) to a secure transaction server 120. According to an aspect of the embodiment, the mobile device 104 can wirelessly communicate with a provider, such as a provider computer system 106. The embodiment(s) described herein relate to mobile wireless computing device user electronic authentication services to perform a transaction. According to an aspect of the embodiments, authentication services are based upon Universal Pervasive Transaction Framework Secure Agreement Submission (UPTF SAS) protocol. Universal Pervasive Transaction Framework (UPTF) is a framework for authenticating transactions initiated by a mobile (radio) device. More particularly, the UPTF SAS protocol is discussed in related pending U.S. patent application Ser. Nos. 11/045,484, filed Jan. 31, 2005; Ser. No. 10/458, 205, filed Jun. 11, 2003; Ser. No. 10/628,584, filed Jul. 29, 2003; Ser. No. 10/628,569, filed Jul. 29, 2003; and Ser. No. 10/628,583, filed Jul. 29, 2003, the entire disclosures of all of which are hereby incorporated herein by reference. More particularly, according to an aspect of the embodiments, a wireless mobile computing device 104 provides user electronic authentication services for a transaction according to authentication view(s) of one or more parties (i.e., in a typical embodiment paired and/or more than two authentication views), wherein the authentication views are time, user and software dependent secured (e.g., encrypted), matched (verified against each other), and transaction party anonymous.

Figure 2:
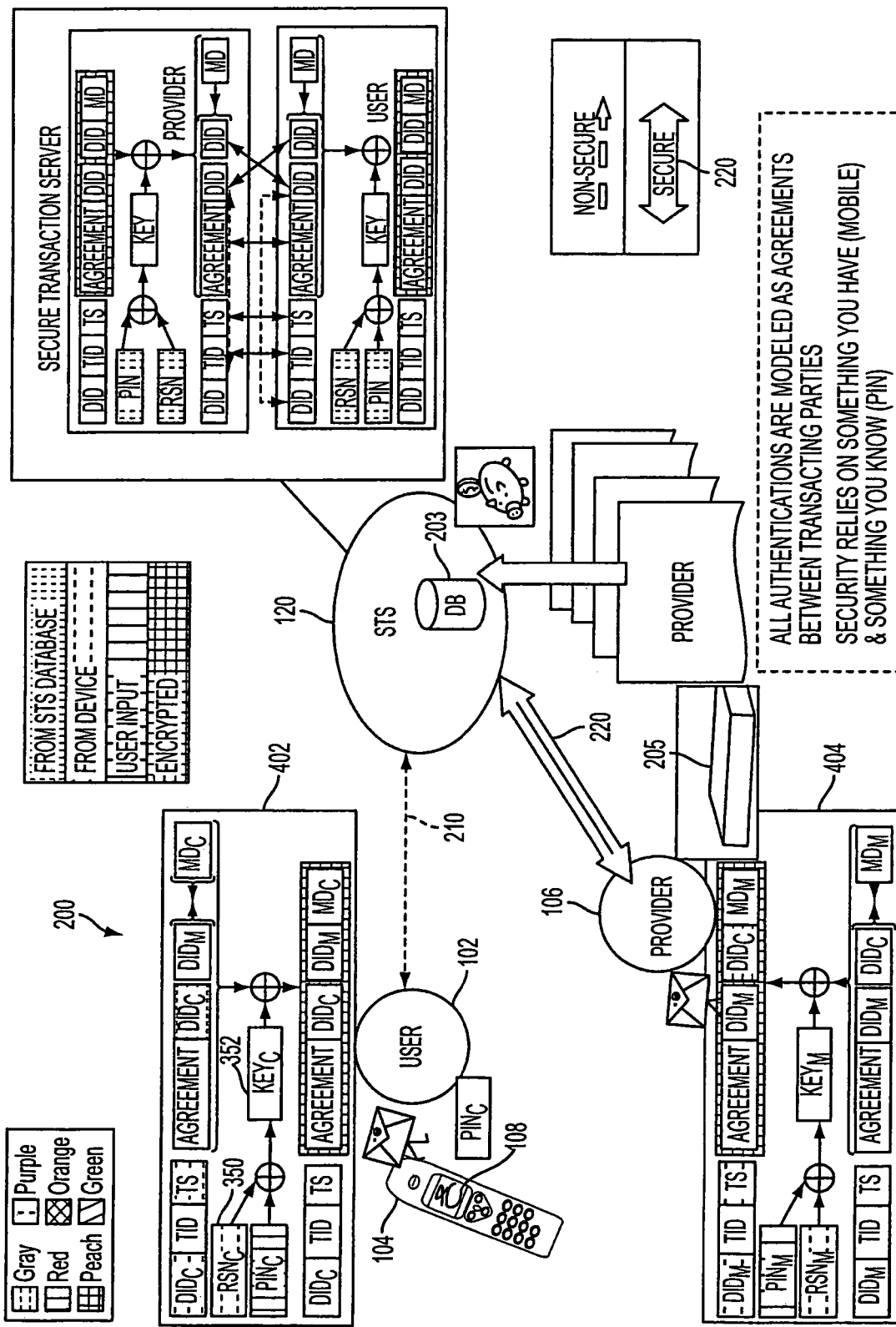
FIG. 2 is a functional block diagram of Universal Pervasive Transaction Framework Secure Agreement Submission (UPTF SAS) system architecture to execute a mobile device authentication service, according to an embodiment of the present invention.

FIG. 2 is a functional block diagram of Universal Pervasive Transaction Framework Secure Agreement Submission (UPTF SAS) system 200 architecture to execute a mobile device authentication service, according to an embodiment of the present invention. In FIG. 2 and other figures, color designations are used to highlight features/concepts described, for example, a type of, or a possible type of, communication channel. For example, communication channels may be Virtual Private Network (VPN), mobile phone or cellular network, or unknown by referring to any known type of computer data communication network. The Universal Pervasive Transaction Framework (UPTF) defines a system architecture based upon independent and anonymous transaction agreement views and a communication security protocol called the Secure Agreement Submission (SAS) protocol to transmit the views. Essentially the UPTF offers a vessel, which is able to securely carry the individual views of a transaction agreement, in this case an authorization and/or an authentication transaction (collectively referred to as an authentication service), from each party involved in the transaction to a trusted third party for verification, using a communication network which may consist of insecure segments, such as wireless Internet, mobile telephone network or cellular links. When used for authentication as a mobile device authenticator 104, the authentication transaction parties are the user 102 and the provider 106 (e.g., a website operator, a computer system) to which the user 102 desires access. A typical example of an "authentication" agreement view may comprise: "User A, Transaction Token."

In FIG. 2, the UPTF SAS protocol encrypts/decrypts a transaction message using a symmetric, secret-key $352_{c,m}$ approach where the secret key $352_{c,m}$ is producible only by an individual party's mobile device 104 and a trusted third party (e.g., implemented as STS 120) and without transmission of the secret key among the parties. In other words, the UPTF SAS provides an implicit user authentication, because decryption by a trusted third party, such as STS 120, of a sending party's encrypted message, authenticates the sending party. The SAS insures that the authenticity of the parties is verified and during delivery, the privacy of the information is preserved (transaction party anonymity), even when the parties distrust each other and the messages from one party may be forwarded by the other to the third party verification (as the case may be). The UPTF provides the mechanism for the trusted third party 120 to verify that the independent views of the authentication are consistent with each other.

In FIG. 2, after the STS 120 extracts the authentication transaction data from the authentication transaction views received from the parties and the STS 120 verifies the received authentication transaction data, further actions may be needed, which, for example, may be realized by the trusted third party 120 interacting with financial institutions associated with the user payer 102 and the provider (merchant) payee 106 to cause the transfer of the specified funds between the user payer 102 and the provider payee 106.

In FIG. 2, a UPTF based mobile authentication service system architecture comprises a user 102 operating a UPTF device (also referred to as Universal Pervasive Transaction Device—UPTD), such as a mobile phone 104 loaded with a mobile identification (ID) application or mobile authentication service software 108 (hereinafter referred to as mobile ID application that can be implemented in software and/or computing hardware), a provider 106 operating another UPTF based device 205, a Secure Transaction Server (STS) 120, and optionally for additional transactions a number of financial institutions (not shown), and several non-secure and secure (as the case may be) communication channels among them. Typically according to an embodiment, the separation of the STS 120 and the provider 106 as shown in FIG. 2 is a logical separation, as a single entity or separate entities (as the case may be) can implement each.

In FIG. 2, according to an aspect of the embodiment described herein, the STS 120 authenticates a mobile device 104 by an authentication parameter(s) 350 to provide a mobile device authenticator 104. The authentication parameter(s) of the STS is secret information used for encrypting the messages to/from each user 102 mobile device authenticator 104 and provider 106, which are stored in a DB 203. The STS 120 receives independently generated UPTF SAS authentication transaction views (described in more detail further below) from both the user 102 and the provider 106 regarding an authentication transaction conducted between them. The STS 120 is able to decode both of the views based upon information from UPTF SAS authentication transaction messages and the information stored in the STS 120 database 203. Following successful decoding, the STS 120 verifies that the view messages are original, authentic, involve the intended user 102 and provider 106 and that the information fields in the authentication views are consistent with each other. The STS 120 can maintain a log of messaging activity for non-repudiation purposes. Therefore, the mobile device authenticator 104 mobile ID application 108 is based on a general framework, called the Universal Pervasive Transaction Framework (UPTF), a generic architecture and a new security protocol for conducting secure multi-party agreements, using mobile devices over a wireless transport network. The framework is designed to address several key aspects specific to the envisioned pervasive communication, including wireless, environments.

In FIG. 2, the mobile device 104 mobile ID application 108 communicates with the STS 120 via a wireless communication channel 210, which is typically non-secure, and can be a wireless Internet 105, a mobile phone network, a local wireless network, or any combinations thereof. Further, wireless UPTF SAS based messages are transportable over the wireless channel 210 using SMS messages to/from the STS 120, or using Hyper Text Transfer Protocol (HTTP), or web service calls, or other known wireless message transport services, or any combinations thereof. The provider 106 and the STS 120 can be separate or collapsed (as the case may be), and the provider 106 communicably connects with the STS 120 via known secure, non-secure, or any combinations thereof communication channel(s) 220.

Figure 3:
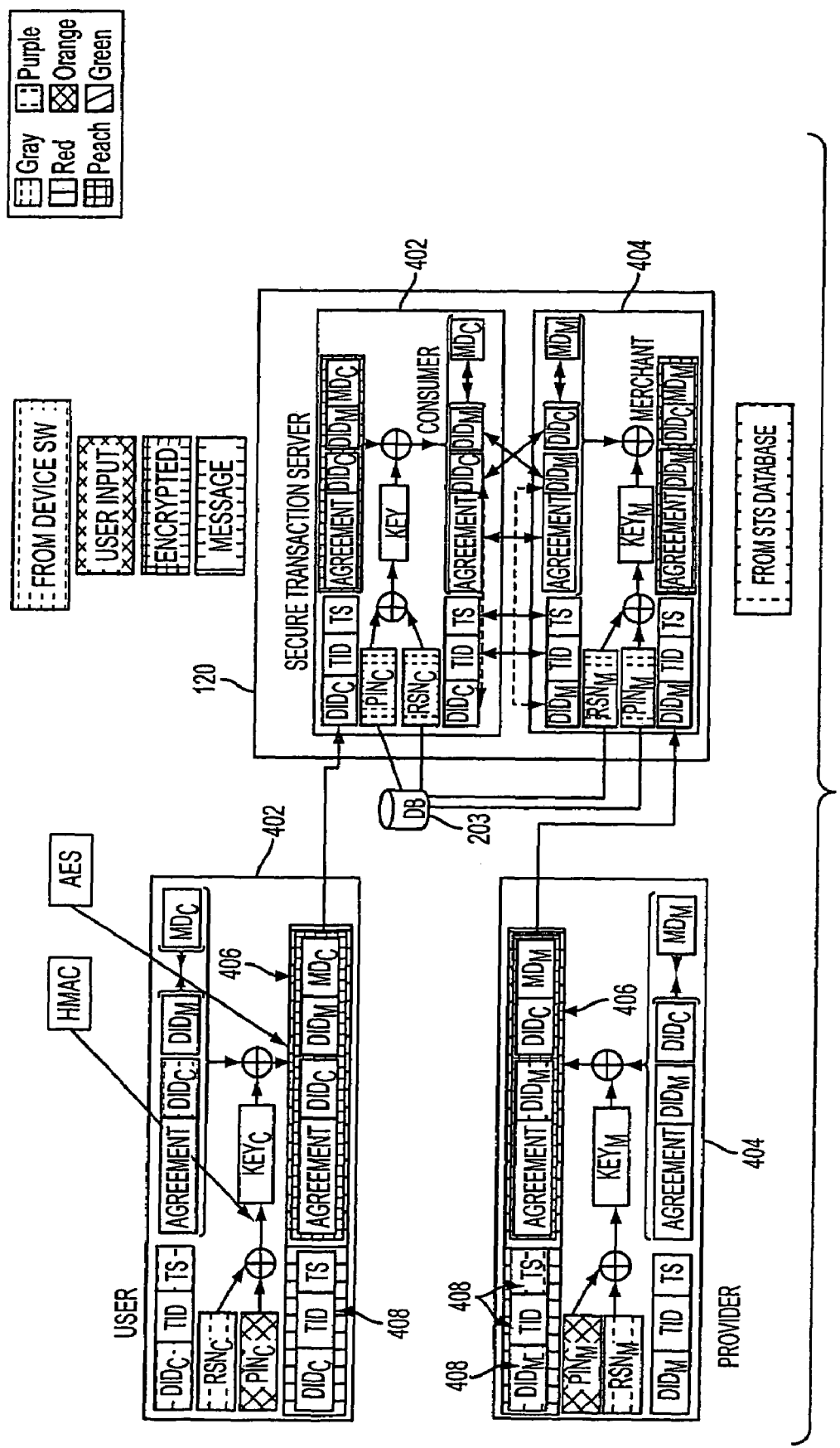
FIG. 3 is a diagram of UPTF authentication request messages based upon Secure Agreement Submission (SAS) protocol to provide a mobile device authentication service, according to an embodiment of the present invention.

FIG. 3 is a diagram of UPTF authentication request messages based upon Secure Agreement Submission (SAS) protocol to provide a mobile device authentication service, according to an embodiment of the present invention. The SAS protocol is used for encrypting and submitting views of desired UPTF based authentication transactions. The message structure and encryption mechanism of SAS are designed to provide many of the desired security properties in an insecure pervasive communication, including wireless, environment for transactions, such as:

Authentication: the agreement parties and the verification party are authenticated to each other, as is the integrity of the agreement group;

Anonymity: agreement parties may remain anonymous to each other and personal and/or other account related information is not revealed to the other party;

Protection of the agreement content: the agreement is kept private, it is tamper-resistant, non-replayable, and strong non-repudiation proper-ties are provided. In particular, a continuously changing, time dependent, device specific key is used to encrypt each view.

The underlying SAS algorithms are well-suited for a system using low-cost user devices, which have limited computing resources, while minimizing the complexity of use for the user. In addition, some of the information necessary to use the SAS, in particular the PIE, is not permanently stored on the mobile device authenticator 102 and not included in any data transmissions, so if the mobile device authenticator 102 is lost or stolen, the mobile device authenticator 104 cannot be used. Additional details of the SAS and the encryption mechanism are provided with reference to FIG. 3, as follows.

FIG. 3 shows the internal structure and the generation process of authentication view messages 402, 404 (i.e., UPTF SAS authentication transaction messages). The provider 106 includes a provider device 205 on which the provider UPTF based transaction messages are implemented. The UPTF SAS based views 402, 404 are implemented in software and/or computing hardware as the mobile ID application or mobile authentication service software 108 that is executed in the mobile device authenticator 102. Since the views 402, 404 from the user 102 and the provider 106 are symmetrical, the user's 202 view 402 is only described. The identifiers used in FIG. 3 are explained below:

DIDc: device ID, a unique identifier for the mobile device authenticator 104 (the user consumer (c) or source transaction party).

DIDm: device ID, a unique identifier for the provider 106 device (the merchant (m) or destination transaction party).

RSN: random sequence number.

TS: local current timestamp.

TID: transaction ID, a unique identification number assigned to an agreement, which is maintained by the STS 120 to identify corresponding UPTF agreement views 402, 404.

MD: message digest

PIE: Personal identification entry, a user and STS 120 maintained input secret entry, such as an alphanumeric string. In a typical embodiment described herein, the PIE is only maintained by the user and the STS 120, is not known to and/or maintained by another party to a transaction and/or any financial institutions and is temporally known as an intermediate parameter to the mobile device authenticator 104 of the user 102 for encrypting the user authentication view 402. More particularly, the PIE is not included in transaction messages (e.g., UPTF SAS messages and/or SAS based informational messages) and, thus, the mobile ID application 108 does not transmit the PIE. The PIE can be non-secure by being a substantially short alphanumeric string, such as a 4 digit number. The user enters the PIE whenever the user attempts a transaction. Preferably the PIE is issued to the user when the user registers for an authentication service using a client device 104, which executes the mobile ID application 108. The user can also select the PIE at such time. The PIE is, however, a piece of highly secure information in the sense that it is never transmitted during the UPTF protocol execution, it is only known to the user and the STS 120, and its secrecy should be well protected. The PIE can be input by the user on a mobile device authenticator 104 in a secure fashion or it may be deterministically generated using a biometric device, such as a fingerprint sensor. For example, a computation applied on the fingerprint data received from a fingerprint sensor can be used to generate a PIE that is initially communicated by the user to the STS 120. Whenever the user attempts a transaction, the user applies her finger to the fingerprint sensor, thus generating the PIE. The PIE is not kept in permanent storage on the mobile device authenticator 104, but is used as an intermediate parameter required for the generation of the encryption key for a transaction and the mobile device 104 should not retain PIE for a period longer than a transaction execution time as determined according to application criteria. If a particular implementation of the present invention uses a form of PIE that is not convenient for a user to input for each agreement transaction and the device needs to store its user's PIN, the storage must be secure and tamper-resistant. According to another aspect of the embodiment, the PIE can be a user 102 biometric input data.

As shown in the FIG. 3, a view 402 comprises a cipher text part (or encrypted part) 406 and a perceptible (e.g., plaintext) part 408. A plaintext part 408 includes the TID, the DIDc of the mobile device authenticator 104 generating the view 402, and the local current timestamp (TS) of device 104. The TS, among other functions described herein, is also used to prevent transaction replay. The encrypted part 406 includes two critical fields: the agreement (authentication transaction) data and the DIDm of the provider's 106 device involved in the agreement. The DIDm is the minimum necessary reference field to provide the desired verification properties of the UPTF protocol. Therefore, a user can execute a mobile device authenticator 104 authentication transaction with a transaction party according to a PIE and a mobile ID application 108 authentication parameter RSN and transaction messages comprising an identifier of the mobile device authenticator 104, an identifier of the transaction party and an identifier for a transaction (for example, an identifier and/or other transaction related data, such as type of authentication, payment amount, etc.), thereby providing the mobile device authenticator 104 based upon a combination of the mobile ID application 108 at the mobile device authenticator 104 and STS 120 association of the PIE and an authentication parameter with the user 102, and exchange of the transaction messages among the user 102, the provider 106 and the STS 120.

First, DIDc and the TS obtained from the mobile device 104 local clock (and/or as provided as a part of the agreement data), are utilized by the device's 104 pseudorandom number generator to generate a time-dependent RSN. Therefore, the parameters of the generator are particular to each device 104. The encryption key K is then generated from the RSN and user input PIE (shown in FIG. 3 with orange coloring), where the PIE is provided from or generated by the STS 120. Firstly, the RSN and PIE are combined using a function F and then a hash function H is applied to the result (typically a string) to generate the encryption key:

$$K=H(F((PIE,RSN))$$

A message digest function can be applied to the agreement data, the DIDm, and the DIDc to generate a MD of the view. The MD can further strengthen the security by ensuring that no other party has tampered with or modified the contents of the view 402 in any way. The encryption algorithm with the encryption key K is then applied to the MD, the agreement data, the DIDc, and the DIDm to generate the cipher text part of the view 402, as shown in FIG. 3 with peach coloring. For further protection, the SAS protocol uses random message padding in order to further prevent "known-text" attacks. According to an aspect of the embodiment described herein, the embodiment uses Advanced Encryption Standard (AES) for encryption, a Keyed-Hashing for Message Authentication (HMAC)-based scheme for random number generation, and SHA1 Secure Hash Algorithm for the hash function.

The STS 120 has sufficient prior knowledge of the functions and specific parameters used by each device 104 in the encryption process, so that when combined with the plaintext portions of a message 402, 404, it is possible to decrypt the message 402, 404 by reversing the above process. For example, from the plaintext part 408 of the view 402, the STS 120 recovers the DIDc and TS, which are used to look-up the customer's 102 PIE and other parameters of the RSN generator that can be stored in the STS 120 database 203. These are used to compute the RSN. The encryption key K can then be computed using the same method with which the device 104 generates the encryption key. The cipher text part 406 of the view message 402 is then decoded.

After all applicable fields of the user 102 view 402 are acquired, the STS 120 locates the provider's 106 view 404 for the same transaction, using the DIDm and TID included in the previously decoded user 102 view 402. After going through a similar decryption process, the decoded fields of the agreement data of the provider 106 view 404 are compared with the corresponding fields from the user 102 view 402. If all applicable corresponding fields match (correspond according to application design), the received views 402, 404 are considered verified. Further processing is then carried out and external executions are triggered as necessary.

Any responses from the STS 120 to the user 102 or provider 106 are encrypted by the STS 120 using the same encryption methods and using the parameters for the destination devices 104, 205 and the TS of the original transaction. Only the intended recipient can decrypt the response message, insuring privacy protection and authentication of the STS 120.

Another example encryption key generation for the UPTF SAS is described herein. In FIG. 3, using the view 402, the key KEYc is a hash of a RSNc and a PIEc; the detailed key generation procedure is as follows:

The initialization data for the RSNc are created when a new mobile device authentication service account is created by the STS (e.g., when the mobile ID application 108 is created (e.g., initialized) by the STS 120. Specifically:

1. a random 128-bit seed is generated using a software service function.

2. a random 160-bit initialization timestamp is created also at new mobile device authentication service function. Therefore, the STS 120 can generate or provide device 104 specific initialization parameters of a random number and an initialization timestamp, both of which, are provided (installed) via the mobile ID application 108 to the device 104 (e.g., mobile device authenticator 104).

The PIE creatable by the STS 120 when a new account is created at the STS 120, as follows: a 32-byte random value is created using a software service function, convert each byte to a decimal value string, and concatenate them all to produce a long string. Randomly chop 4 digits from this string to create PIE.

When the key needs to be created in order to encrypt a transaction message, the following steps take place:

1. A 160-bit current timestamp is generated, as follows:
 a. Convert current time to string, for example, converting the current time to a 16 characters string, e.g., 5:04 pm, Jan. 26, 2006 is written in "0000170401262006."
 b. Take the string and a one way function to output another value, for example by hashing the current time string using SHA1 algorithm, which produces a 160-bit output.

2. XOR an init timestamp and current timestamp to produce a 160-bit output. This operation is essentially a form of deterministically calculating a difference between two values of time (i.e., a deterministic transformation between two values).

3. Use the 128-bit seed software authentication parameter as data, and the XORed value of the two time stamps as the key, compute the HMAC result (a 160-bit value). The result of the HMAC is the RSNc. Use of the HMAC accommodates unpredictability in the RSNc generation.

4. Chop the first 128-bit of the HMAC result, combine (e.g., concatenate) with the 32-bit PIE (convert from a 4 digit string) for a 160-bit value.

5. Compute the hash (SHA1) value of the 160 bit stream in operation (4), and chop the first 128 bit as the final key.

In the encrypted part of the message a hash of the transaction part of the message (with the padding) using SHA1 (alternatively a CRC can be used) is used.

In the above-described embodiment, the values of a number of bits are provided as unlimiting examples, and the present invention is not limited to a specific number of bits values. Therefore, as illustrated with reference to FIGS. 2 and 3, a UPTF SAS based transaction requires a device 104 which provides device-specific parameters that determine a device-specific and time-specific key and an operator for the device who provides a fixed PIE that is only known to the STS 120 and the operator. The combination of the two is required for an encrypted transaction request that can be validated by the STS 120. Intercepting one (or more) transaction message and successfully decrypting it would not be sufficient for purposes of inferring either the PIE, or the device specific parameters employed in the key generation process. Moreover, a single, time-dependant key is not re-usable because of the pair-wise agreement notion of transactions processed by the STS 120.

Figure 4:
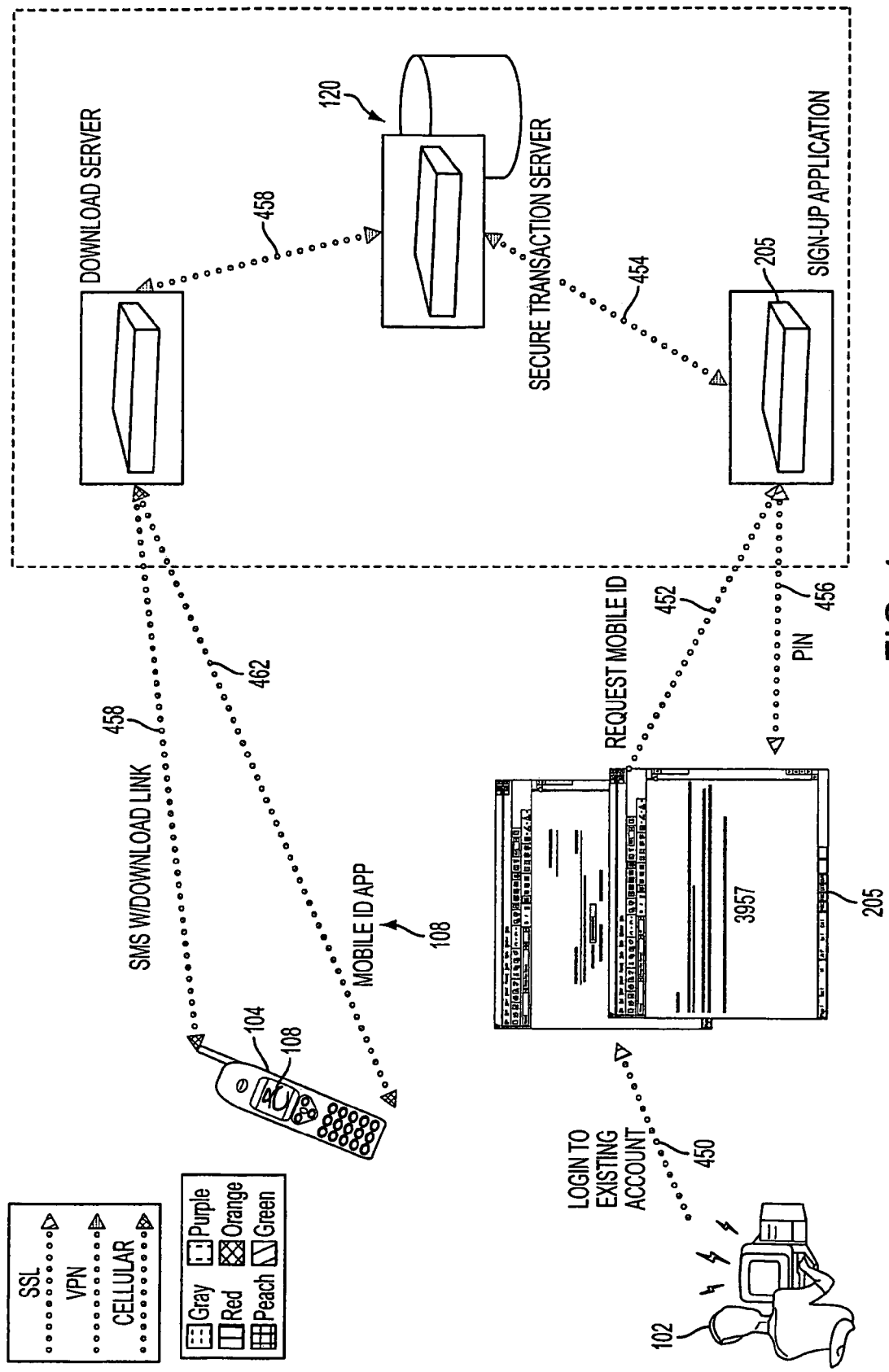
FIG. 4 is a system flow diagram of provisioning a mobile device authenticator, according to an embodiment of the present invention.

FIG. 4 is a system flow diagram of provisioning (i.e., "providing a service," which includes distribution to a user and associated system actions) a mobile device authenticator 104, according to an embodiment of the present invention. In FIG. 4, a mobile phone is used as an example mobile device authenticator 104. A method, comprising, at operation 450, a user 102 logs into an existing account at a provider 106. At operation 452, the user selects a mobile device authenticator 104 service, which according to an embodiment is a mobile ID application 108 download request from the provider 106. However, the embodiments are not limited to a configuration of downloading a mobile ID application 108 to the mobile phone 104, and a mobile device authenticator 104 can be activated through other techniques, such as (without limitation) pre-installed software and/or computing hardware (e.g., an integrated circuit), so long as a mobile device authenticator 104 authenticable by the STS 120 is provided. At operation 454, the provider 106 device 205 communicably connects with the STS 120 for providing a mobile device authenticator 104.

In FIG. 4, the method at operation 454 further comprises initializing, at the STS, a mobile ID application 108 with software authentication parameter(s), as an authentic mobile ID application 108. Also, at operation 454, correlating, at the STS 120, a personal identification entry (PIE) (e.g., a PIN) and an identifier of the mobile phone 104 with the authentic mobile ID application 108. At operation 456, the PIN can be communicated to the user 102. Of course, at operation 450, the user 102 can supply a PIN. At operation 458, installing, in the mobile phone 104, the authentic mobile ID application 108. According to an aspect of the embodiment, at operation 458, the mobile phone 104 receives a Short Message Service (SMS) with a download link to the authentic mobile ID application 108. At operation 462, the user 102 can download the authentic mobile ID application 108. When the authentic mobile ID application 108 is installed in the mobile phone 104, the user can execute, at the mobile phone 104, the installed authentic mobile ID application 108 using the PIE (e.g., PIN) to execute a mobile phone authentication transaction as a mobile device authenticator 104.

According to an aspect of the embodiment described herein, at operation 454, one or more software authentication parameters are selected, which can be (without limitation) creation of a new seed, such as a new random seed number, and an initialization time. At operation 454, the STS 120 stores in a database 203, a unique identifier (referred to as Device ID, or DID) for the mobile phone 104, which can, for example, be a mobile phone number of the mobile phone 104 or some randomly generated globally unique identifier (GUID), a mobile phone carrier (as the case may be), or the software authentication parameter(s), and the generated PIE, or any combinations thereof. According to an aspect of the described embodiment, a mobile phone number can also be used as a device identifier for the mobile phone 104. The unique identifier (device ID (DID)) of the mobile phone 104 is used by the STS 120 to correlate a transaction message with the authentic mobile ID application 108 (i.e., to correlate the DID with the software authentication parameter(s) and the PIE stored at the STS 120, so that the STS 120 can generate a key that corresponds to a device 104 having the DID. The mobile phone number can be used to communicate short messages (e.g., notifications, etc.) with the mobile phone 104 (e.g., Short Message Service (SMS), including (and/or) Multimedia Message Service (MMS)). The mobile phone 104 can be an Internet enabled, according to known techniques, mobile phone. According to an aspect of the embodiment(s) described herein, an authentication transaction message is bound to a unique combination of a user 102 and a mobile device authenticator 104, the binding to the user is via the PIE and the binding to the device 104 is via the software authentication parameter(s) of the authentic mobile ID app 108. In particular, a transaction is an SAS based encrypted message and the encrypted message can be traced back to a combination of the user 102 and the device 104 through the PIE and the software authentication parameter(s) of the authentic mobile ID application 108.

Figure 5:
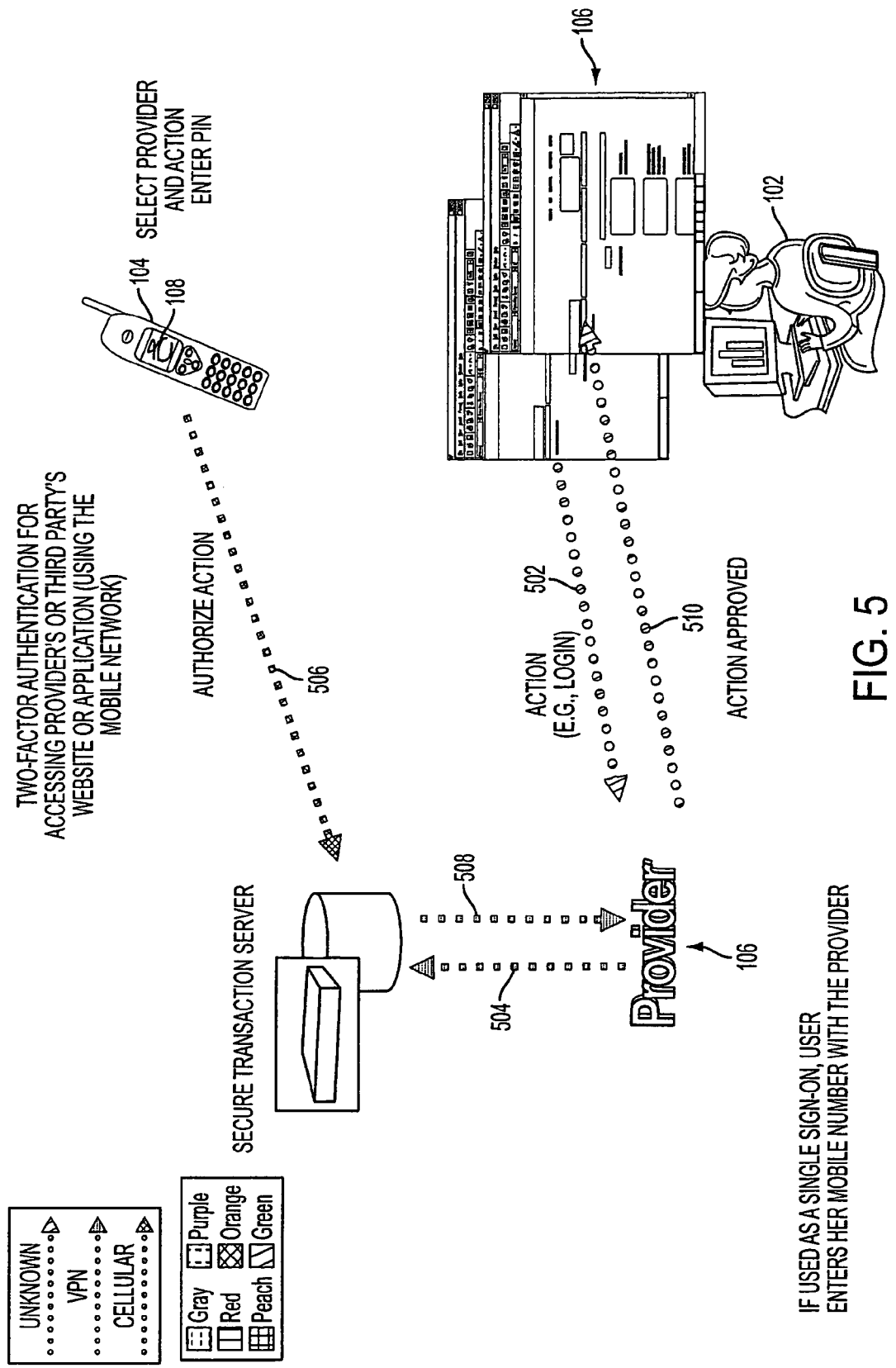
FIG. 5 is a system flow diagram for a two-factor user authentication to access a computer system, according to an embodiment of the present invention.

Authentication transactions using a mobile device 104 are described next. FIG. 5 is a system flow diagram for a user authentication to access a computer system, according to an embodiment of the present invention. FIG. 5 is a transaction authorization (such as a login) to a website. Both cases are described, where the mobile phone 104 is used as a second factor authentication tool and a case where the mobile phone 104 is used as a single factor, also referred to as single sign-on.

In FIG. 5, a method, comprises authenticating a mobile device communicably connectable to a wireless network by an authentication parameter from a secure transaction server (STS) 120, as a mobile device authenticator 104 (see FIG. 4); providing an STS 120 correlation between a personal identification entry (PIE), such as a PIN, and the mobile device authenticator 104 (see FIG. 4); and inputting, by a user, the PIE and a provider action, to the mobile device authenticator 104 to transmit a transformed secure user authenticable authorization request to the STS 120 over the wireless network to authorize an action with (or at) a provider (i.e., a user authorization to perform an action with a provider).

More particularly, in FIG. 5, at operation 503, the user 102 accesses the website 106 that the user would like to authenticate itself to. For example in order to login, the user 102 enters the user's username and password to log into the web site. The website displays a page with a "please wait" message, and in the meantime, at operation 504, the provider's web site sends a UPTF message to the STS 120 as the provider's authentication view, at which time the STS 120 waits for the user's authentication view. As discussed above, all parties to a UPTF based authentication transaction operate authentic devices/software based upon authentication parameters known to the STS 120, so in this case both the mobile device authenticator 104 and the provider 106 device 205 generate UPTF messages that are authenticable and mutually verifiable by the STS 120, as discussed above. At operation 506, the user starts the mobile ID application 108 on the mobile phone 104, selects the provider (e.g., Bank) and the action to authorize (e.g., log in) and then enters the user's PIN. At operation 506, the mobile ID application 108 generates and sends a UPTF message to the STS 120. At operation 508, the STS 120 compares the mobile phone's message to the previously received message form the provider 106, and if the two messages agree, the STS 102 responds positively to the provider 106. At operation 510, the provider 106, upon receiving a positive response, approves the user's login request and authorizes the user's access to user's account and proceeds to display to the user a webpage with the user's account information. Therefore, the mobile device authenticator 104 is a second factor authentication in addition to the first factor user's username and password entered at the website.

Alternatively, in FIG. 5, if the authentication application 108 is used as a single sign-on, instead of a two factor authentication, at operation 502, the user can initially enter the user's mobile phone number at the website instead of the provider-specific username and password. The provider 106 can use a known technique for verifying that the user has access to the phone the user claims to have access. For example, In this case, at some prior time, the user has registered the mobile number with the provider 106 and at such prior time some form of authentication has taken place to ensure that this mobile number is associated with the owner of the specific account. Then, after the user has logged into the user's account using the provider-specific username and password, the user can provide the user's mobile phone number, and the provider sends a SMS with a unique number to the specified mobile number. The SMS contains a unique number of sufficient length that is difficult to guess, which the user is expected to later submit to the provider's website at a moment that she is already logged onto her account. Here, the provider supplied SMS is only used for purpose of verifying that a user has access to the mobile phone that the user claims to have access.

According to the embodiments, a mobile device authenticator 104 executes an authentic mobile ID application 108 to provide a time-driven, device-dependent, user input dependent and out of band authentication token usable for single factor and/or second factor authentication. According to an aspect of the embodiments, the mobile device authenticator 104 requires that the user enters a PIN (only known to the user and not stored on the mobile phone), thus preventing unauthorized users from using the said mobile phone for single factor and/or two-factor authentication. According to another aspect of the embodiments, authentication takes out of band by being transported over a wireless network, such as wireless network 105, which is different than the network or channel for submitting the first factor, thus preventing or substantially reducing snooping scenarios. Therefore, for example, the methods described herein prevent phishing and consequences of phishing by further authenticating a possible fraudulent transaction based upon the embodiments described herein. According to an aspect of the embodiments, the mobile ID application 108 can be a feature of Wireless Wallet software discussed in related pending U.S. patent application Ser. No. 11/045,484, filed Jan. 31, 2005, entitled "WIRELESS WALLET," the entire disclosure of which is hereby incorporated herein by reference.

The following four example methods of two-factor authentication are more particularly described herein. If used in conjunction with another authentication method, these methods should be thought of as second factor authentication methods. Alternatively, if not used in conjunction with another authentication method, these methods should be thought of simply as authentication methods (optionally referred to as single factor). As authentication methods, they can be used in a variety of contexts, such as for authorizing access to a computer system, performing an action that requires authorization, performing a financial transaction, transacting at an ATM, etc.

Figure 6A:
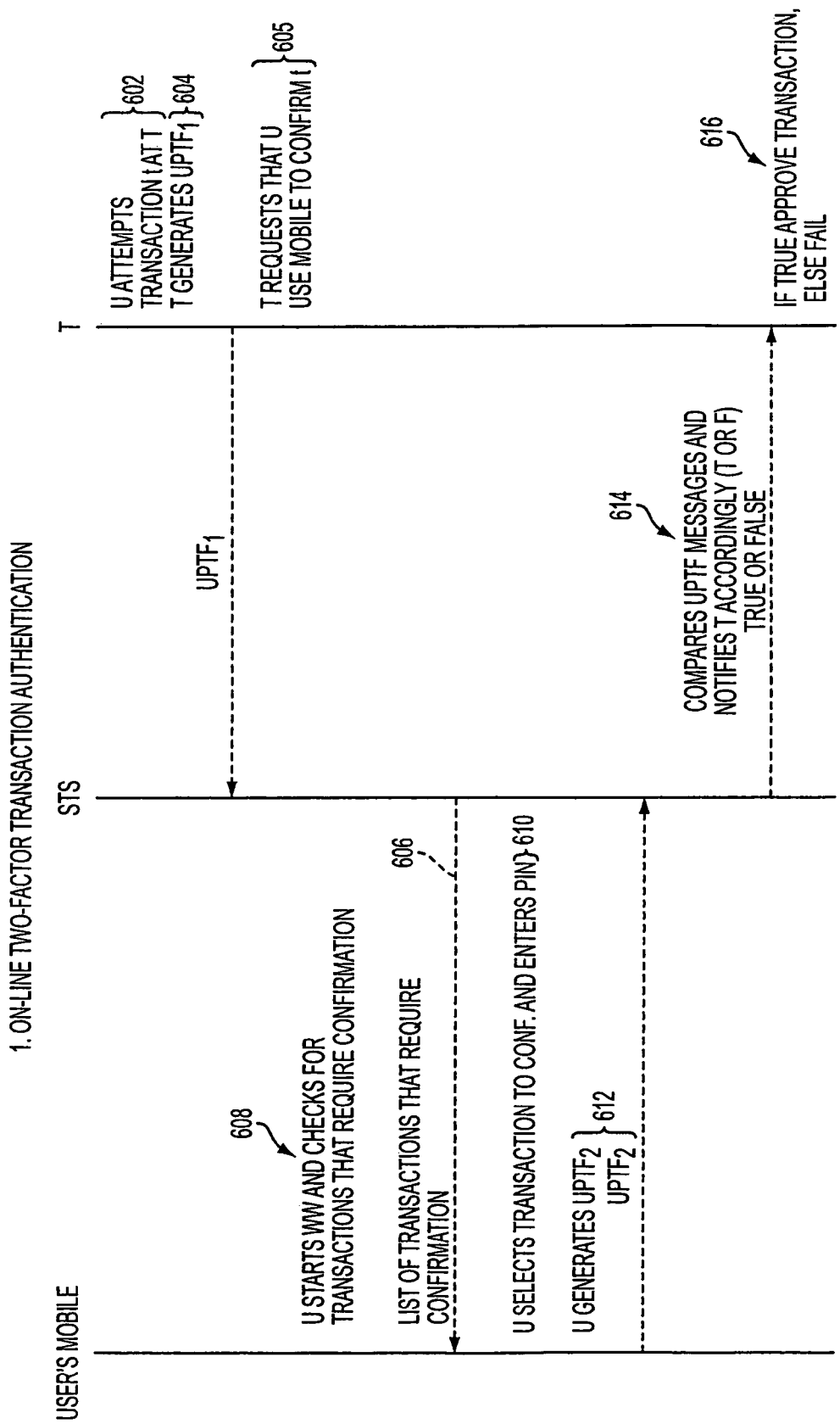
FIG. 6A is a system flow diagram for a mobile device online, via a mobile device wireless network, two-factor user transaction authentication, according to an embodiment of the present invention.
Figure 6B:
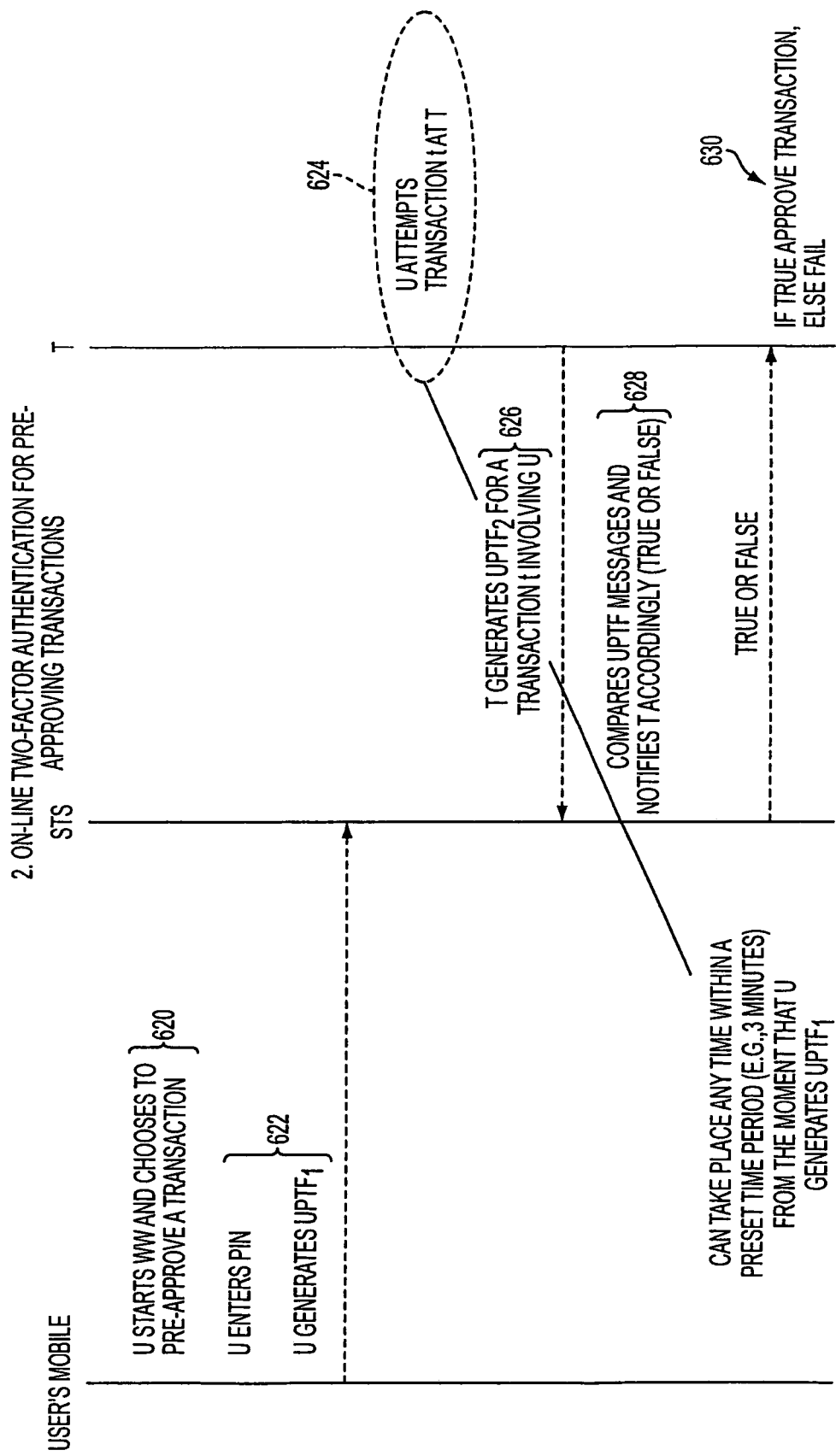
FIG. 6B is a system flow diagram for a mobile device online, via a mobile device wireless network, two-factor pre-approved user transaction authentication, according to an embodiment of the present invention.

FIG. 6A is a system flow diagram for a mobile device online, via a mobile device wireless network, two-factor user transaction authentication, according to an embodiment of the present invention. FIG. 6A corresponds to FIG. 5. FIG. 6B is a system flow diagram for a mobile device online, via a mobile device wireless network, two-factor pre-approved user transaction authentication, according to an embodiment of the present invention. FIG. 6B corresponds to 9 (described in more detail below). FIGS. 6A and 6B, the first two methods, require that the user has, for example, a J2ME-capable and web-enabled mobile wireless device, such as a mobile phone. Software and/or programmable computing hardware of the present invention embodied (for use) in a mobile device can be written in any language that is installable and executable on the mobile phone, such as Java 2 Platform, Micro Edition (J2ME), Binary Runtime Environment for Wireless (BREW), any other language that might be installable on the mobile phone so that applications written in that language can be executed on the mobile phone, or any combination thereof. Both methods require web access for authentication (on-line authentication)

In FIG. 6A, the first method, at operation 602, the user first attempts the transaction (e.g., login) at the website terminal (T) 106, and at operation 604, the website generates a UPTF1 message and transmits the same to the STS 120. In the mean time, at operation 605, the user is asked to confirm the transaction from her Wireless Wallet, possibly within a fixed time period. At operation 606, the STS 120 sends, via a wireless network, a list of transactions that require confirmation to the mobile device authenticator 104 (M). At operation 608, the user starts Wireless Wallet and checks for transactions that require confirmation, based upon the received lists of transaction. At operation 610, the user selects a transaction to confirm, and, at operation 612, the user enters the user's PIN to generate a UPTF2 message and transmit the same, via wireless network, to the STS 120. At operation 614, the STS 120 authenticates and verifies the UPTF1 and UPTF2 messages by decrypting the same and comparing the corresponding authentication transaction views 402, 404. At operation 614, if the authentication transaction views 402, 404 are authenticable and mutually verifiable, the STS notifies the website (T) accordingly. At operation 616, if the website receives a positive or true authorization result, the website approves the transactions.

In FIG. 6B, the second method, at operation 620, the user pre-authenticates a certain type of transaction and she has a fixed time period (e.g., 3 minutes) within which she may attempt the transaction at the website (T) 106. At operation 620, the user starts the Wireless Wallet and chooses to pre-approve a transaction, and at operation 622, the user enters the PIN and the Wireless Wallet generates and transmits via a wireless network a UPTF1 message 402 to the STS 120. At operation 624, the user attempts the transaction at the website (T) 106, and, at operation 626, the website generates a UPTF2 message 404 for the transaction involving the user and transmits the same, via a wireless network, to the STS 120. Operations 628 and 630 are similar to operations 614 and 616 for approval of the attempted transaction by the user.

Figure 6D:
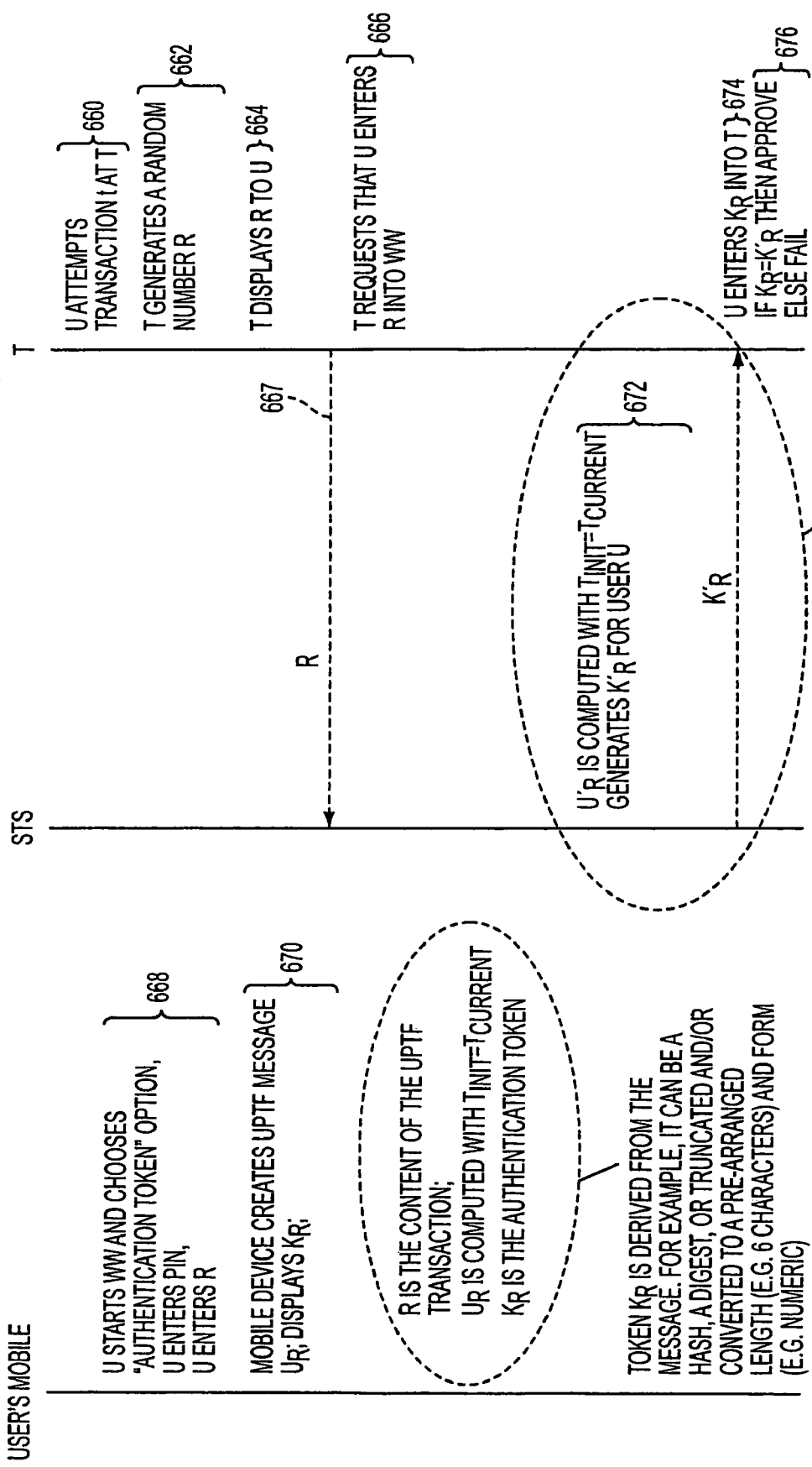
FIG. 6D is a system flow diagram for a mobile device off-line (off wireless network) two-factor user transaction authentication without clock sync requirements, according to an embodiment of the present invention.

FIGS. 6C and 6D, the methods three and four only require a device, or a mobile device, that can execute software, for example, a J2ME-capable phone, such that the user does not need to connect to the network in order to achieve authentication (off-line). The fourth method has the advantage over the third method that no clock synchronization is necessary.

In FIG. 6C, at operation 640, the user attempts a transaction at a provider 106, such as a website (T) 106. At operation, 642, the website requests the user to provide further authentication or the second factor. In such a case, at operation 644, the user of the mobile phone 104, which runs the mobile ID application 108 or Wireless Wallet with the mobile ID application feature (as the case may be), would first select from a menu of which transacting party they wish to authenticate themselves with (e.g., "ABC Bank", "ABC Auctions", XYZ Credit Card" etc.) and subsequently select the type of action. Then, at operation 644, the user chooses an "authentication token" option and the user enters PIN at the mobile device authenticator 104. At operation 646, the mobile phone 104 generates and displays a UPTF key 352 (as described above), which is usable as an authentication token K. At operation 648, the user enters K. At operation 650, the web site 106 ask the STS 120 to confirm K for user for the current time, because, as discussed above, the UPTF key 352 is time dependent and this embodiment also relies on device time synchronization. At operation 652, the STS 120 generates K' for user and current time and compares K' with K. If, at operation 652, K' and K are mutually verifiable by being identical or within a range (according to application criteria), the STS 120 authenticates user, and the STS 120 notifies the web site 106 of a true authentication result. At operation 654, the web site 106 approves the transaction in response to a true user authentication result received from the STS 120.

In FIG. 6C, according to an aspect of the embodiment, at operation 646, instead of using the UPTF key 352 as "an authentication token," the UPTF key 352 is used to encrypt a transaction. The transaction has content, such as "Action Type" as postulated by the UPTF; also the UPTF message according to the protocol specification, already includes the other transacting party's identifier and the user's identifier. "Action Type" can be, for example, if the user wants to "Log In", or "Transfer", or any other action defined and permitted by another transacting party. Therefore, at operation 646, the mobile ID application 108 produces an encrypted authentication view message 402 (described above), and optionally, a transformation that produces a shorter (than the encrypted part of the UPTF message 402) string is presented to the user and usable at operation 648 as the entered authentication token K. For example, a message digest function can be applied to the encrypted part of the UPTF message 402, to produce the authentication token. The same transformation will be applied by the STS 120 to produce the authentication token for that user, at that time, for that action with the specific transacting party.

FIG. 6D is a system flow diagram for a mobile device off-line (off wireless network) two-factor user transaction authentication without clock sync requirements, according to an embodiment of the present invention. At operation 660, the user attempts a transaction at a provider 106, such as a website (T). At operation 662, the transaction content comprises an a random number "R" supplied by T 106 as well as an "action type," such as an "Action Type" postulated by the UPTF; also the UPTF message 402, 404 according to the protocol specification, already includes the other transacting party's identifier and the user's identifier. "Action Type" can be, for example, if the user wants to "Log In," or "Transfer," or any other action defined and permitted by other transacting party. At operation 664, the website 106 displays R to the user and, at operation 666, the website 106 requests the user to enter R into the Wireless Wallet or the mobile ID application 108 (as the case may be) running on the mobile phone 104. At operation 667, the web site 106 provides R to the STS 120. At operation 668, the user of the mobile phone 104 would first select from a menu of which transacting party they wish to authenticate themselves with (e.g., "ABC Bank", "ABC Auctions", XYZ Credit Card" etc.) and subsequently select the type of action. More particularly, at operation 668, the user chooses an "authentication token" option and the user enters PIN and the "R" at the mobile device authenticator 104. At operation 670, the mobile ID application 108 creates a UPTF message 402 $U_R$, where R is the content of the UPTF transaction and based upon $U_R$ an authentication token $K_R$ is generated, and displays $K_R$. More particularly, at operation 670, $U_R$ is computed with $T_{init}=T_{current}$ and $K_R$ is the "authentication token" generated based upon $U_R$. In other words, at operation 670, the "authentication token" is derived from a UPTF message $U_R$ 402. For example, the $U_R$ derived "authentication token" $K_R$ can be a hash, a digest, a truncated and/or converted to a pre-arranged length (e.g., 7 characters) and form (e.g., numeric). In other words, after producing the encrypted message 402, optionally, a transformation that produces a shorter (than the encrypted part of the UPTF message) string is presented to the user and used as the "authentication token" $K_R$. At operation 672, the same transformation will be applied by the STS 120 to produce the authentication token for that user, for that action, with the random value R and for the specific transacting party. At operation 672, which can take place any time after the STS 120 receives R from the web site 106, the STS 120 generates authentication token $K'_R$ for user U, which is based upon a UPTF message $U'_R$ 404 computed with $T_{init}=T_{current}$. At operation 672, $K'_R$ is provided to the website 106 and, at operation 674, the user enter $K_R$ into the web site 106. At operation 676, if $K_R=K'_R$, the web site 106 approves the transaction. According to another aspect of the embodiment, the STS 120 can perform the authentication token verification of $K_R=K'_R$. According to an aspect of the FIG. 6D embodiment, UPTF message clock synchronization is not required by replacing time with R (R can by any token) to provide an R dependent "authentication token" rather than FIG. 6C embodiment that uses a time-dependent UPTF key 352 as an "authentication token."

Figure 7:
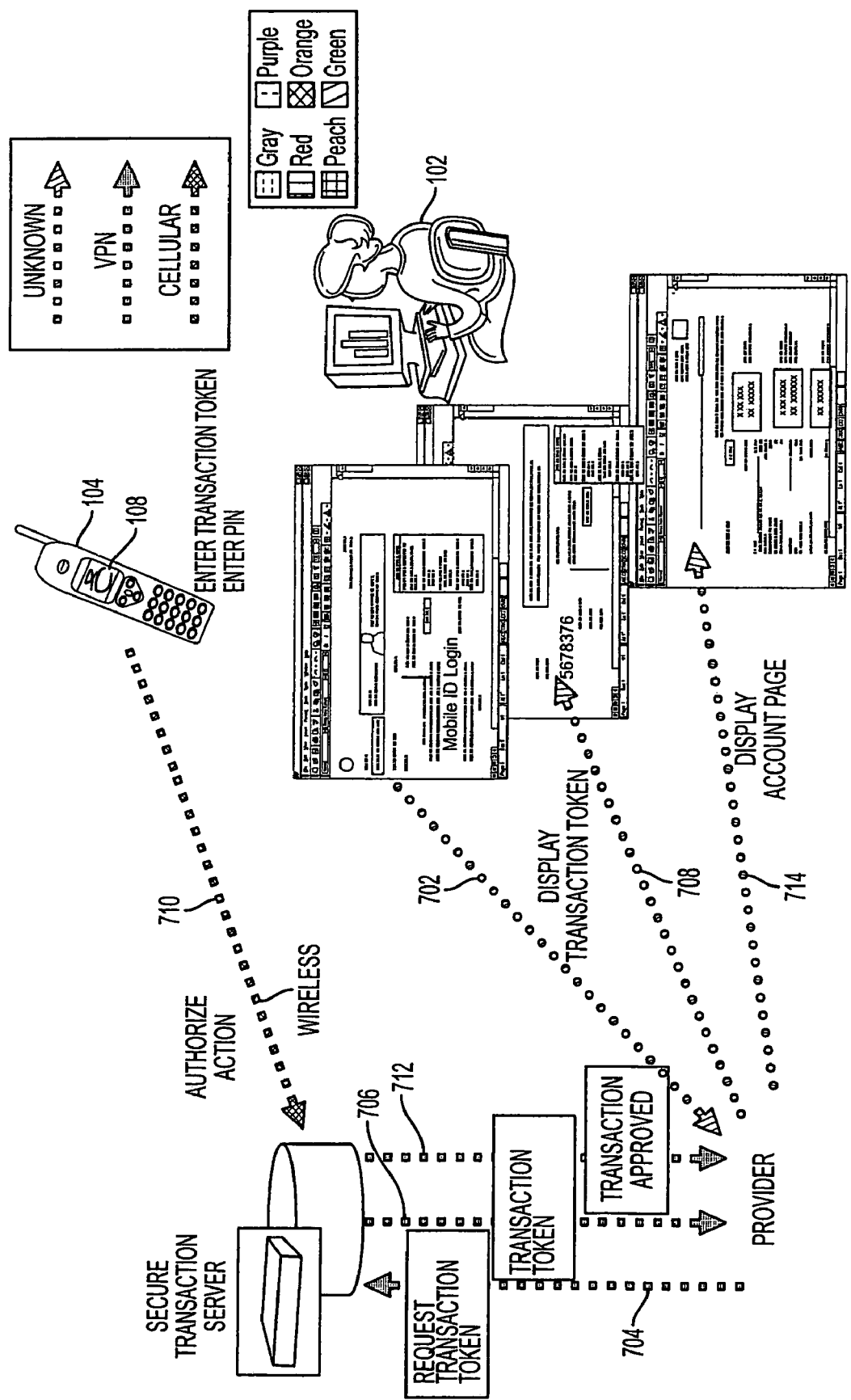
FIG. 7 is a system flow diagram of a user authentication using a mobile device online, via a mobile device wireless network, and UPTF to access a computer system, according to an embodiment of the present invention.

FIG. 7 is a system flow diagram of a user authentication using a mobile device online, via a mobile device wireless network, and UPTF to access a computer system, according to an embodiment of the present invention. One objective is for a user to securely log in to their account at a website provider 106 without having to enter the username/password combination for the specific user at the specific website 106. According to an aspect of the embodiment, a website provider 106 has signed up or registered with the operator of the STS 120 to receive the authentication service provided by the STS's operator. This is a case of a Single Sign On (SSO), which refers to the mobile ID application 108 as the only means used for authenticating the identity of the user accessing the website 106 or verifying a user requested action.

The user experience is described. Lets assume the user 102 attempts to log in to their Bank account 106. At operation 702, the user 102, using her browser (on a desktop, or laptop, or a device different than their mobile phone 104) goes to the Bank website 106 and selects to log in. Typically, at operation 702, the website 106 provides a single mobileID login selection, such as a single selectable displayed icon for the user to authorize an action via the mobile device authenticator 104. At operation 704, the Bank server 106 (205) sends a UPTF message 404 (request transaction token) to the STS 120, and, at operation 706, receives back a unique code, preferably a 5 or 6 digit number (Transaction Token1) that in turn, at operation 708, is provided to the user, for example, displayed on the login page of the website 106. The transaction token may be displayed as a CAPTSHA ("completely automated public Turing test to tell computers and humans apart," a term known in the art), so that only a human can read this number.

Then, at operation 710, the user 102 starts the mobile ID authentication application 108 on their mobile 104, and enters in the application 108 the transaction token provided to the user 102 via the webpage 106. Then, at operation, 710, the user enters her PIE (e.g., a PIN) at the mobile device 104. At operation 710, the software 108 generates a UPTF message 402 that includes in its transaction content the Transaction Token1 and wirelessly transmits the UPTF message 402 to the STS 120. The UPTF message might also include Transaction Token 1 in its plaintext part, to speed up processing by the STS 120.

At operation 712, the STS 120 compares the Bank sent message 404 (the request transaction token message 402) and the user sent message 402, as previously described and if the two transaction messages agree or are mutually verifiable, the STS 120 sends responses to the user and the Bank server 205. At operation 712, the response to the Bank server 205, for example, a transaction approved response can include the user identifier (e.g., phone number) for the user 102 that sent a UPTF message 402 with Transaction Token1

If, at operation 712, the STS 120 response was positive, at operation 714, the Bank website 106 will update the previously displayed page with the user info for the account associated with the user identifier received at operation 712 by the bank from the STS 120. At this point the user 102 is considered authenticated and the user, through the browser, can access her account.

Although in FIG. 7, the STS 120 creates the Transaction Token1, it is also possible that the provider 106 creates the Transaction Token1. For generality, i.e., in case that the mobile ID application 108 is used to authenticate the user in multiple websites 106, it is preferable that the STS 120 generates the Transaction Token1 to ensure the uniqueness of each Transaction Token1 and for further defense against fraud as described next.

Defenses against fraud: The most important danger can occur if the userA mistypes the unique code Transaction Token1 into the phone 104 and instead enters a Transaction Token2 (similar but different than Transaction Token2). In such a case, if an attacker B is randomly reloading the Bank page for generating a new unique code and happens to load a page associated with the Transaction Token2, the attacker's B page will be updated with user's A account info.

There are methods to prevent this kind of attack that do not involve user A, as follows:

First of all, the STS 120 could generate unique codes that are resilient to mistyping, as a result of transposing digits, or hitting the wrong button (e.g., hitting an adjacent button) assuming a mobile phone's button layout. The goal of the STS is to generate unique codes that are sufficiently "distant" from one another for purposes of misentering them.

The STS could log IP addresses or IP ranges used for accessing a specific account and pair them with a STS ID (the user's mobile phone application identifying DID) and/or the IP ranges of the cellular provider for the specific mobile phone number.

A method to prevent this kind of attack that requires user A's help, is the following: When responding to the user's mobile, the STS also transmits a verification code. The same verification code has also been transmitted to Bank. The user is asked to enter this verification code to the page she is looking at prior to displaying the account info. If A mistyped Transaction Token1 and entered Transaction Token2, when attacker's B page updates and asks for the verification code, attacker B can not enter the verification code because it was sent to A's mobile phone application.

A less intrusive but still requiring user's assistance method, is prior to displaying the account info on the webpage, to ask the account holder a question that only the rightful account holder would know, e.g., the numeric part of her address, the apartment number, the month of birth, last 4 digits of SSN, or last 4 digits of mobile phone number used to access the website. The attacker, who has no idea whose account is going to be displayed, stands a very slim chance of making a correct guess. The attacker not only needs to be lucky enough to have a user mistype their unique code, but they also need to be lucky enough for that mistyped code to be what appeared on their page and then guess correctly some other information for which they can only make a random choice.

Another method would be to ask the mobile user, after receiving the STS response to confirm that the webpage on their desktop/laptop computer has updated. If the user responds negatively (using the mobile application), the STS could notify the webpage provider (e.g., Bank) to terminate the session associated with this unique code that the mobile user entered. In this case, the attacker B would momentarily see the account page but the Bank server 205 would terminate this session upon the user's negative confirmation.

Of course any combination of these methods is also possible.

Figure 8:
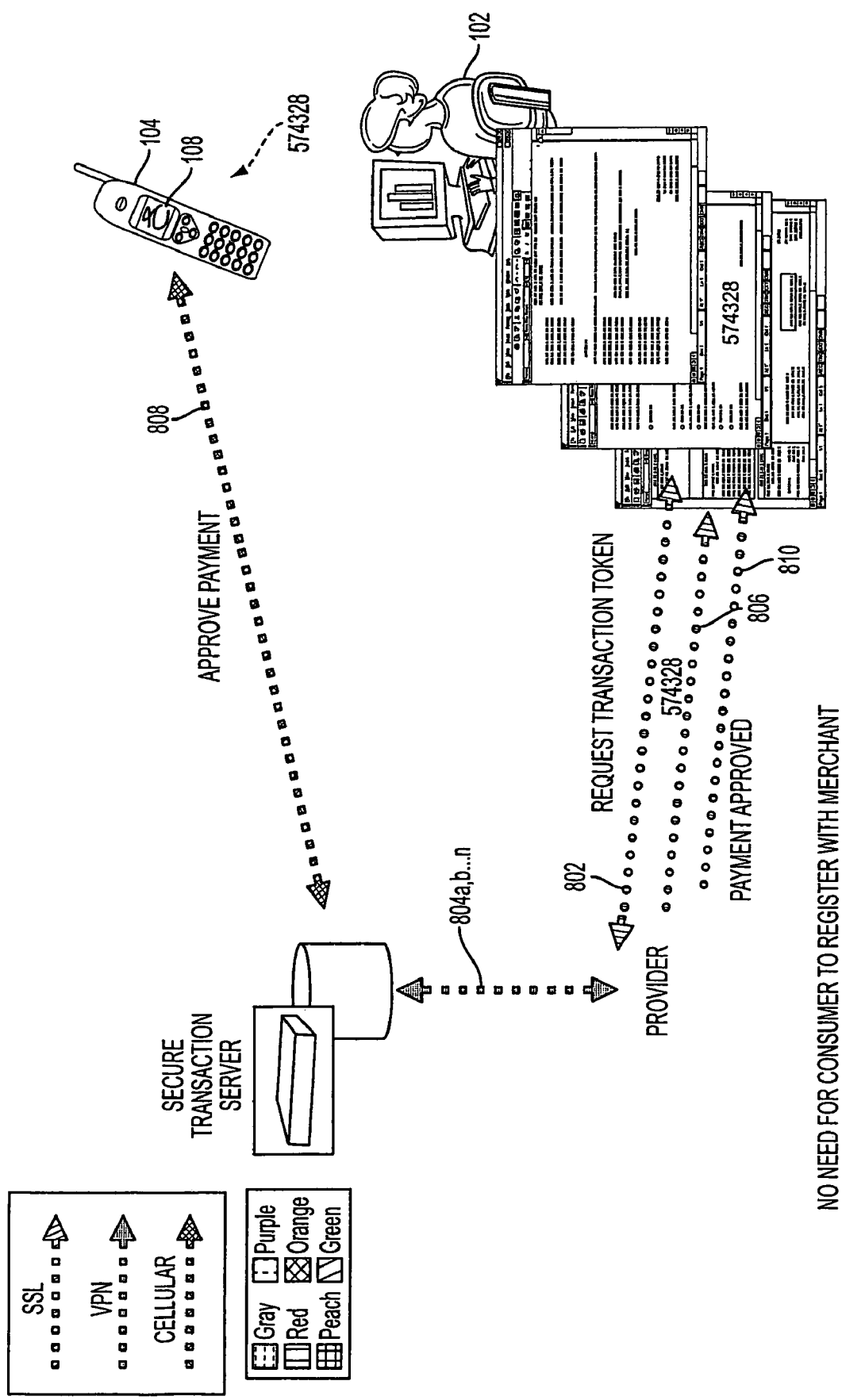
FIG. 8 is a system flow diagram of authorizing payment for a web transaction using a mobile device online, via a mobile device wireless network, according to an embodiment of the present invention.

FIG. 8 is a system flow diagram of authorizing payment for a web purchase using a mobile device online, via a mobile device wireless network, according to an embodiment of the present invention. According to an aspect of the embodiments, a method of purchasing from a website 106 is provided.

A user 102 can select purchases from a website 106 the way she would normally do until she decides to checkout, at which point she typically needs to enter her payment information and approve of the transaction. At operation 802, the website 106 displays to her the option of paying with her mobile phone 104. At operation 802, the user 102 chooses to pay with her mobile phone 104, at which point, at operation 804*a*, the website 106 (technically the server 205 that operates the website 106, which is associated with the provider 106 of the web site), sends a UPTF message 404 (request transaction token) with a description of the transaction and the amount to be paid, to the STS 120 and receives back a unique code, preferably a 5 or 6 digit number (Transaction Token1) that in turn, at operation 806, is displayed to the user at the check out page, inviting the user to approve payment from their mobile phone 104 using Transaction Token1 as a reference to this transaction.

Then, at operation 808, the user starts the mobile ID authentication application 108 on their mobile 104, and enters in the application 108 the transaction token provided to the user at operation 806 via the website 106. Then, at operation 808, the user 102 enters her PIN. At operation 808, the software 108 generates a UPTF message 402 that includes in its transaction content the Transaction Token1 and wirelessly transmits the UPTF message 402 to the STS 120. The UPTF message 402 might also include Transaction Token1 in its plaintext part, to speed up processing by the STS 120.

At operation 804*b*, the STS compares the website 106 sent message 404 and the user sent message 402, as previously described and if the two transaction messages agree or are mutually verifiable, the STS 120 determines that the user has authorized payment for the transaction referenced by Transaction Token1 to the provider (merchant) 106 associated with the transaction referenced by Transaction Token1 and the STS 120 sends the transaction for fulfillment to the relevant financial institution. In addition, optionally the STS 120 might respond to the mobile device 104 with a listing of accounts that can be used for the purchase, so that the mobile user can select the account to use. It also, sends affirmative responses to the user and the website server. At operation 810, the provider 106 can send a payment approved notification to the user via the website. The response to the merchant might include the mobile user's name and shipping address, if shipment of physical goods is necessary for the transaction. The benefit of this approach is that the consumer does not need to share their financial information with the merchant and they need not enter any sensitive information on the website which provides protection in the case that the website is a fraudulent one.

Figure 9A:
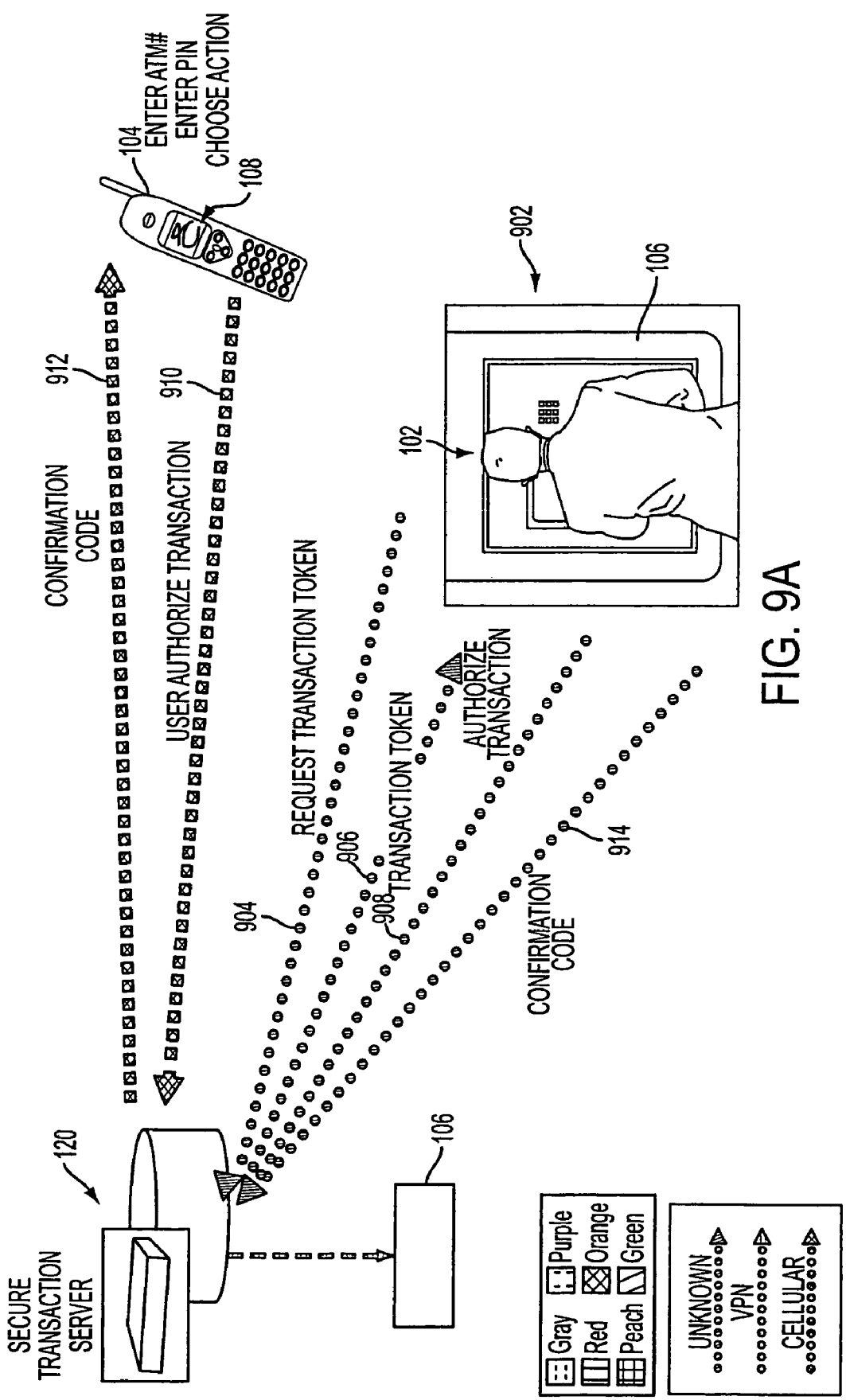
FIG. 9A is a system flow diagram of a transaction with an automated teller machine (ATM) using a mobile device online, via a mobile device wireless network, and UPTF, according to an embodiment of the present invention.
Figure 9B:
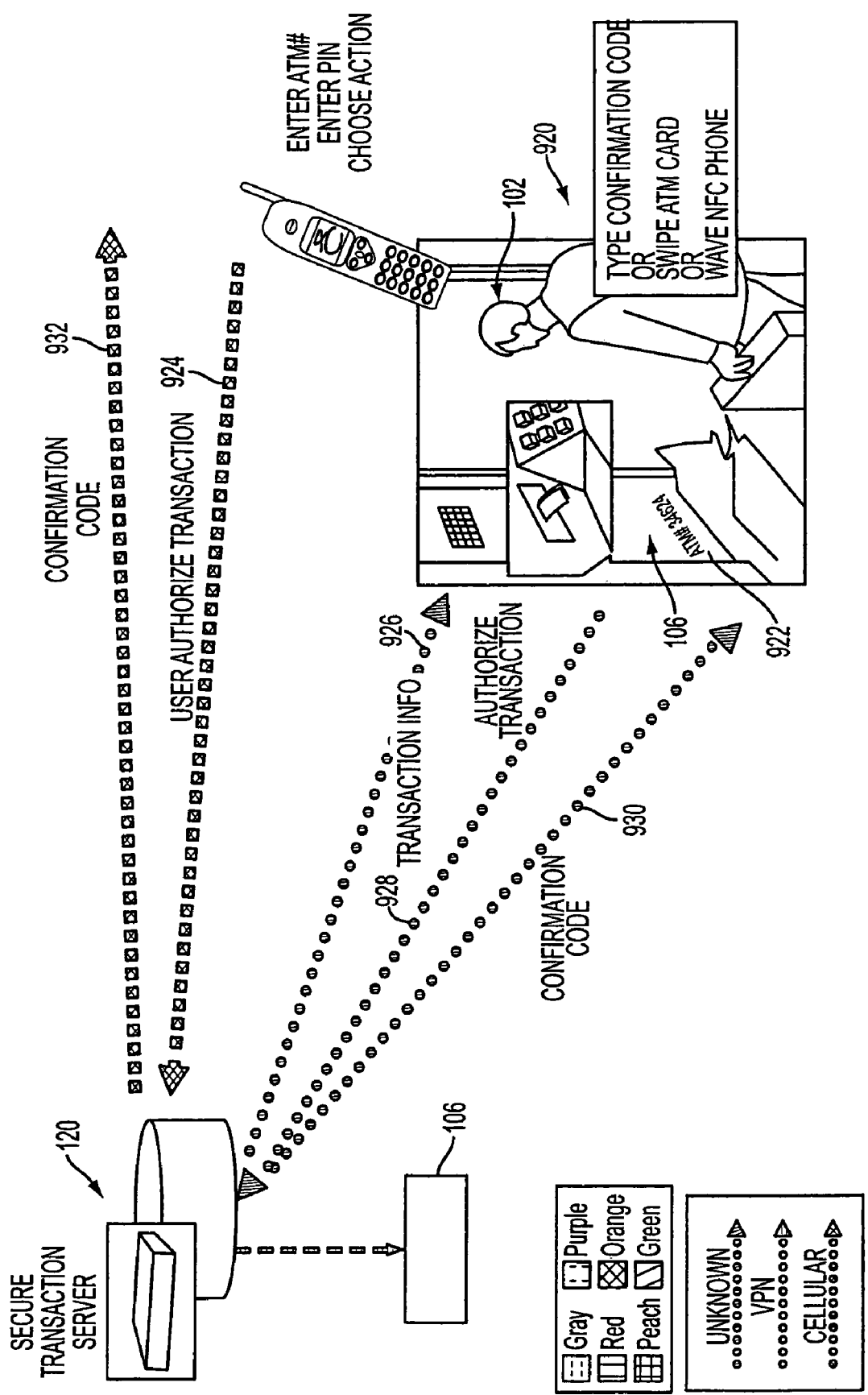
FIG. 9B is a system flow diagram of a transaction with an automated teller machine (ATM) using a mobile device online, via a mobile device wireless network, and UPTF, according to another embodiment of the present invention.

FIGS. 9A and 9B are system flow diagrams of transactions with an automated teller machine (ATM) using a mobile device online, via a mobile device wireless network, and UPTF, according to embodiments of the present invention. Methods for performing transactions with an ATM using a mobile device 104 and without the need for the user to present their bankcard to the ATM for performing such transactions are provided. Of course, it is possible that the mobile device 104 can also be used in addition to the card, in which case the transaction approval from the mobile phone 104 serves as a second factor authentication, or pre-authorization that shortens the time spent on the ATM itself.

A method of withdrawing cash from, or conducting other transactions with, an ATM using the mobile phone 104, is as follows:

In FIG. 9A, at operation 902, the user 102 approaches an automated teller machine (ATM) 106 and attempts to perform a transaction, e.g., withdrawing money, as they would normally. The only difference is that the user 102 chooses "use mobile phone" in the opening user interface menu of the ATM application and begins her transaction without swiping their bankcard. After the user finalizes the details of an attempted transaction, e.g., withdrawing $100 from checking account, or making a deposit for $123.45, or checking the balance of the account, the ATM asks the user to verify the transaction from her mobile 104. At that point, at operation 904, the ATM 106 requests, via a UPTF message 404 (request transaction token), from the STS 120 a Transaction Token for the transaction specified by the user at the ATM. At operation 906, the ATM receives a response UPTF message 404 from the STS 120 with a specific Transaction Token, preferably a 5-6 digit number, and provides to the user (e.g., displays) the Transaction Token. Then, at operation 908, the ATM 106 transmits to the STS 120 a UPTF message 404 authorizing the transaction identified by the Transaction Token. Alternatively, the ATM 106 request for a transaction token to the STS can be also considered by the STS as a transaction authorization for the transaction identified by the specific Transaction Token, thus obviating operation 908. Possibly concurrently, at operation 910, the user (consumer) 102 starts her mobile ID application 108, enters the Transaction Token and her PIE at the mobile device 104, which wirelessly transmits to the STS 120 a UPTF user authorize transaction message 402 that includes the Transaction Token. The STS 120 verifies the UPTF user authorize transaction message 402 of operation 910 against the ATM authorize transaction message 404 of operation 908 or against the request token transaction message at operation 906, if operation 908 is omitted (as the case may be). The STS 120, at operations 912, 914, upon a successful transaction verification, transmits a confirmation code to the mobile device 104 and the ATM 106. At operation 914, after the ATM receives the confirmation from the STS 120, the ATM concludes the transaction, e.g., delivering the specified cash to the user. Essentially, the mobile ID authentication 102 serves as an authentication token, replacing a bank card.

Alternatively, the ATM might display a Transaction Token at the beginning of the user's interaction with the ATM, i.e., right after the user selects "use mobile phone" at the ATM user interface. In this case, the user performs the steps mentioned above, right after the ATM displayed the Transaction Token and prior to executing any specific transaction. In this case, the Transaction Token can be valid not for a specific action but for the entire session that begins after the ATM receives a confirmation code and until the user specifies on the ATM that she is "done."

In FIG. 9B, according to another aspect of the embodiment, the user transacts with the ATM 106 and access account functions, especially money withdrawal, without having to use their bankcard and prior to interacting with the ATM 106 user interface, for example, while waiting in line, or before the user arrives in front of the ATM, at home, or in the car. An ATM transaction authorized through the mobile phone 104 will be fulfilled or completed whenever the user can interact with the ATM. The time between the user authorizing the transaction from the mobile device 104 and the user arriving at the ATM can vary depending on application criteria, but generally understood that the user will have to fulfill the ATM transaction at the ATM within a specified period of time. When the user is prepared to interact with the ATM, the user approaches the ATM, selects on the ATM the withdrawal by mobile option and simply enters her verification or confirmation code received from the STS 120 (as described in more detail below). The ATM responds by completing a previously started or requested transaction, e.g., giving her the previously requested amount of cash.

More particularly, at operation 920, the user 102 stands in the area of the ATM 106 prior to interacting with the ATM user interface, perhaps waiting in line. The ATM posts (physically), a number ATM_ID 922 (in a visible area, say next to its logo) that uniquely identifies this particular ATM. The STS 120 knows this ATM by that ATM identifying number. It is also possible that the ATM is automatically determined by the location of the user, for example, if the mobile phone 104 is equipped with GPS or location capabilities, or can be selected by the user in the mobile ID application 108 from a listing of pre-stored entries, or from a listing of entries that are added to the mobile ID application 108 by the user, or selected from a listing provided given the zip code of the user's location (the user types the zip code), or from a listing compiled from information of the particular cell that the user's mobile phone 104 is connected, or any combinations thereof. Then, at operation 924, the user 102 starts the mobile ID authentication application 108 on their mobile 104, and, optionally, enters in the application 108, the ATM identifier, such as the number the user sees on the ATM (ATM_ID 922). Then, at operation 924, the user enters her PIE at the mobile device 104. At operation 924, the mobile application 108 generates a UPTF message 402 that includes in its transaction content the ATM_ID and is sent to the STS 120 as a user authorize transaction. The UPTF message might also include ATM_ID in its plaintext part, to speed up processing by the STS. At operation 926, the STS 120 sends to the ATM identified by ATM_ID a message that identifies the user that attempts to interact with the ATM and the details of the requested transaction and a Transaction Token used to refer to this specific transaction. The ATM determines if the ATM can indeed perform the requested transaction for the specified user, and if determined positively, at operation 928, the ATM sends to the STS 120 an ATM authorize transaction UPTF message 404 for the transaction identified by the transaction token. The STS 120 verifies the UPTF user authorize transaction message 402 against the ATM authorize transaction message 404, and the STS 120, at operations 930, 932, upon a successful verification transmits a confirmation code to the mobile device 104 and the ATM 106. Once the user is physically present at the ATM to interact with the user interface of the ATM 106, the user must enter the confirmation code at the ATM to complete the transaction. According to an aspect of the embodiment, the confirmation code could be the previously ATM-generated Transaction Token.

In all the described variations, the mobile ID application 108 can be used for transactions with a multitude of different bank and credit card accounts. The user after authorizing the transaction on the mobile phone 104 could just insert her card to the ATM (without the need to enter the PIN or type anything else on the ATM) after which the ATM will simply execute the previously authorized transaction.

According to an aspect of the embodiments, variations of UPTF based authentication transactions with an ATM using a mobile device 104, are next described. The described variations pertain to transaction with an ATM using a mobile device, but when it is time to authenticate herself to the ATM, the user relies on some form of Near Field Communication for authentication, instead of entering information to the ATM.

User requests the transaction as before, while waiting in line, or in short time prior to getting to the ATM. When the user approaches the ATM, she waves a Near Field Communication (NFC)-enabled phone to the NFC-enabled ATM which responds by executing the previously requested transaction, e.g., by giving the user the previously requested amount of cash. The NFC is a means to identify the phone and by extension the owner of the phone, who is ready to fulfill a transaction. The NFC effectively replaces the need to type in the confirmation code. Of course, the transaction has already been specified and authenticated, so the transaction is not effected by or through the NFC. NFC refers to all types of short-range, radio-frequency local communication, such as RFID, contactless smartcard, NFC chip, IR, Bluetooth, WLAN, or anything that provides proximity-based identification, or any combinations thereof, etc. Additionally, the phone might display a barcode that can be read by an ATM equipped with a barcode-enabled reader, or it might "play" an audio signal to an accordingly equipped ATM. Also, user biometric information, such as face recognition, palm vein, fingerprint, etc., can be used for the user to identify herself to the ATM.

According to the UPTF SAS based authentication methods, it might be assumed that both agreement parties use SAS to create their agreement messages or views. The SAS refers, in part, to how individual messages are created and encrypted, i.e., how a time-dependant key is generated utilizing a party's PIE, which is then used to encrypt respective messages. A variation of all the methods is that a party other than a mobile device 104, such a "provider" 106, might use a method other SAS to communicate agreement messages to the STS 120. In an unlimiting example, according to an aspect of the UPTF embodiments, a provider 106 can encrypt a UPTF agreement message with a private key of the provider 106 and communicate UPTF agreement messages with the STS 120 according to a typical private/public key pair of a PKI system. Of course the content of the agreement message itself will be still be an agreement message according to the UPTF. Although in the described embodiments the transaction token is as a number, the embodiments are not limited to such a configuration, and any identifier to identify and bind a transaction to a user can be used.

According to an aspect of the embodiments, non-UPTF methods for user authentication are provided. A non-UPTF method for the same application as described for FIGS. 5 and 6A. One objective is for a user to securely log in to their account at a website without having to enter the username/password combination for the specific user at the specific website.

Each of these websites 106 has signed up with the operator of the STS 120 to receive the authentication service provided by the STS's operator. This means that for each website, a user's regular login and password (account) has been associated with this user's mobile phone number. This method can be used for a user to authenticate herself to the website but without using a mobile ID application 108 based upon the UPTF protocol, but instead relying on a mobile device 104 dialing an Interactive Voice Response (IVR) system and/or wireless messages, such as SMS including MMS.

For example, the user 102 via a mobile device 104 sends a SMS to a known number associated with authenticating a login into a specific website (or a collection of them). The user might also include a previously issued (by the authentication service 120) PIE in the SMS. Following the receipt of the SMS by the authentication server 120, the website logs the user in her account, such that the SMS is used to approve a transaction with the provider. As an additional security measure (in case an attacker sends a SMS in way that impersonates that the SMS came from a specific mobile phone number), the authentication server 120 could respond by sending a SMS to the mobile number that the first SMS came from; that SMS response will need to be confirmed, for example by having the user follow a link in the SMS. Or, the authentication server could respond by sending a SMS to the mobile number SMS that includes a code that the user needs to type at the website, which will log the user into the account that is associated with the phone number of the mobile that was used to send the first SMS from.

Instead of SMS the user could call an IVR system and type in their PIE in the IVR system; the authentication server responds by sending a SMS with a URL or code (same as before) to the mobile number that was identified by the call to the IVR system (using a caller ID-like capability).

According to the embodiments, a method, comprises registering, by a provider, with a secure transaction server (STS) for a user authentication service to perform an action at the provider; wirelessly transmitting, by a user, a user authorization request to the STS; authenticating by the STS the user, according to the wirelessly transmitted user authorization request; and transmitting, by the STS, to the provider a user authentication service result to authorize the action at the provider, according to the authenticating. According to the method, the wirelessly transmitting the user authorization request to the STS comprises wirelessly transmitting, by the user, the user authorization request in a short message service (SMS) to the STS, or inputting, by the user, the user authorization request including a personal identification entry (PEI) via an interactive voice response (IVR) system, or any combinations thereof.

According to another aspect of the non-UPTF based embodiments, a method of purchasing from a mobile phone is provided. The user uses a browser running on the mobile device for the purchasing but without the need to type in a username/password combination or financial instrument information at the web site where the purchasing occurs. The method is suitable in situations where the user, after the purchase presents to a machine or a person the financial instrument that was used for the purchase.

The owner of a mobile phone (user) has already an account with the entity that provides the mobile payment service and she has already registered with that provider an authentication instrument, such as a credit card, a debit card, a driver's license or some other such instrument.

When registering for the service of making payments using a mobile phone, the user shares with the provider the mobile phone number of the mobile phone that will be used for making purchases from. Optionally, the provider might send a SMS to the mobile phone number provided by the user with the link to the web site that purchase can be made at, so that the user need not type the URL in her mobile phone's browser (a typically difficult task).

At the time of purchase from the mobile device, the user directs her browser at the mobile device 104 to the web site of the provider or to a web site affiliated with the provider or to a web site that accepts payments with the provider. At the time of purchase, she enters into a form presented by the provider into the browser at the mobile device 104 her mobile phone number (as opposed to a username/password combination entry at the mobile device 104) in order to identify herself and selects as the payment method one of the payment instruments shared with the provider. For security reasons, the web site does not display specific account info but only nicknames for the registered accounts. Typically, these actions take place in the phone's 104 browser at a page "served" by the provider 106.

When the user collects what was paid for, for example the movie ticket for a movie ticket purchase, she presents a provider-registered authentication instrument to a person or a machine that can verify that this authentication instrument is associated with the aforementioned purchase. The benefit of this method is that at the time of purchase the user need only type a numeric entry (10 digits) which is much easier to type than a username/password combination.

The method provides security against a fraudulent transaction, i.e., in case someone other than the rightful owner of the mobile phone tries to make the purchase, because an authentication instrument associated with the mobile phone number entered at the moment of purchase has to be presented for the transaction to be completed. Moreover, the user can conduct the transaction from a mobile phone other than her own (or from a PC-running web browser) because the authentication instrument has to be presented for the purchase to be completed.

On a variation of this method, instead of utilizing an authentication instrument physically presented at the moment of collection, a SMS with a unique transaction identifier and an optional transaction description can be sent to the mobile phone specified at the time of purchase. The transaction will be completed if and only if it is approved by the user by responding to that SMS. Optionally, the user may attach a provider-issued PIE at the SMS; the PIE was issued by the provider at the time of the user's registration for the service and is not stored on the mobile phone 104.

In view of the above described examples of preferred embodiments, an apparatus suitable for use in implementing the embodiments described herein can be any computing apparatus or machine, such as (in an unlimiting example) a programmable electronic device that can store, retrieve, and process data, allow mobile (wireless or radio) telecommunication with other computing devices and have one or more communicably connected components of computer/computing processors, such as Central Processing Units (CPUs); input unit(s)/device(s) (e.g., microphone for voice command/control, etc., keyboard/keypad, pointing device (e.g., mouse, pointer, stylus), touch screen, etc.); output unit(s)/device(s) (e.g., computer display screen (including user interface thereof, such as graphical user interface), speaker(s), printer(s), etc.); computer network interface(s), including known communication protocols thereof, (e.g., mobile telephone (voice/data (Internet)) (cellular radio networks, satellite, etc.) network, radio frequency technology, local area network, etc.); and recording media to store information/instructions, such as software (e.g., operating system, wireless wallet software, etc.) and/or data (any known recording media, such as volatile and/or non-volatile memory (Random Access Memory), hard disk, flash memory, magnetic/optical disks, etc.) for execution by a computing apparatus, such as a computer/computing processor and/or electronic circuitry. The embodiments provide methods, apparatuses (computer systems) and/or computer readable media for user authentication services using a mobile wireless data communication device.

The many features and advantages of the embodiments described herein are apparent from the detailed specification and, thus, it is intended by the appended claims and equivalents to cover all such features and advantages of the embodiments that fall within the true spirit and scope of the embodiments. Further, since modifications and changes might occur to those skilled in the art, it is not desired to limit the embodiments to the exact construction and operation illustrated and described, and accordingly all suitable modifications and equivalents may be resorted to, falling within the scope of the embodiments.

What is claimed is:

1. A method, comprising:
   authenticating a mobile device communicably connectable to a wireless network by an authentication parameter from a secure transaction server (STS), as a mobile device authenticator;
   providing an STS correlation between a personal identification entry (PIE) and the mobile device authenticator; and
   providing an authentication function upon a user attempting an access to a provider as an action with the provider, the provider including a physical environment, a computer system, or any combinations thereof, according to one or more authentication services including an authentication service of:
   receiving by the STS, a provider authentication request, in response to the user attempted access to the provider computer system,
   transmitting by the STS a transaction token to the provider computer system, in response to the received provider authentication request,
   inputting, by a user, the PIE and the transaction token, to the mobile device authenticator to transmit a transformed secure user authenticable authorization request to the STS over the wireless network as a user authorization of the action with the provider, based upon the PIE, the transaction token and the authentication parameter,
   verifying, by the STS, the provider authentication request and the user authorization to access the provider,
   transmitting, by the STS, a user authentication result to the provider computer system, according to the verifying, and
   authorizing the user access to the provider computer system, according to the user authentication result transmitted from the STS.

2. The method according to claim 1, wherein the user attempted access to the provider computer system comprises submitting a single manipulation action request to the provider computer system.

3. The method according to claim 1, wherein the mobile device authenticator is a mobile phone communicably connectable with a mobile phone network, wireless Internet, or any combinations thereof, as the wireless network, and the method further comprises:
   associating, by the provider computer system, a user password and username for accessing the computer system with a mobile phone number of the mobile phone, and
   inputting by the user only the mobile phone number at the provider computer system in the attempted access to the provider computer system.

4. The method according to claim 1, wherein another authentication service comprises:
   providing a login function to the provider computer system using a username and password in place of transmitting the transaction token, and
   authorizing the action with the provider based upon the user inputting the PIE and the provider action, to the mobile device authenticator to transmit the transformed secure user authenticable authorization request to the STS over the wireless network.

5. The method according to claim 1, wherein the wireless network is Internet, and the method further comprises:
   logging, by the STS, Internet Protocol (IP) address of a plurality of mobile device authenticators that transmit user authenticable authorization requests to the STS,
   wherein the STS verifying further comprises comparing the IP address of each mobile device authenticator with a corresponding authentication parameter.

6. The method according to claim 1, wherein the transmitting of the user authentication result to the provider computer system further comprises transmitting, by the STS, a verification code to the mobile device authenticator and to the provider computer system,
   wherein the provider computer system authorizes access in response to the STS user authentication result and user input of the verification code.

7. The method according to claim 1, wherein the provider computer system comprises an Internet web site login web page, and the transaction token is displayed on the login web page as a Completely Automated Public Turing Test To Tell Computers And Humans Apart (CAPTSHA).

8. The method according to claim 1, wherein the mobile device authenticator is a mobile phone communicably connectable with a mobile phone network, or wireless Internet, or any combinations thereof, as the wireless network.

9. The method according to claim 1, wherein the PIE is a 4 or more digit personal identification number, biometric information of the user, or any combinations thereof.

10. The method according to claim 1, wherein the transformed secure user authenticable authorization request to the STS over the wireless network is a user payment authorization, and the method further comprises:
    verifying, by the STS, a provider payment request and the user payment authorization; and
    settling by the STS the payment to the provider.

11. The method according to claim 1, wherein the provider computer system is an automated teller machine (ATM), or a website, or any combinations thereof.

12. The method according to claim 1, wherein the transformed secure user authenticable authorization request to the STS over the wireless network is according to Universal Pervasive Transaction Framework Secure Agreement Submission (UPTF SAS) protocol.

13. The method according to claim 1, wherein the transformed secure user authenticable authorization request is a time-dependent and authentication parameter dependent user key, and another authentication service further comprises:
    presenting, by the user, the user key to the provider;
    transmitting, by the provider, the user key to the STS;

generating, by the STS, an STS-generated user key for a current time, in response to receipt of the provider-submitted user key;

verifying a match between the STS-generated user key and the provider-submitted user key; and authenticating, by the STS, the user for the provider, according to the verifying.

14. The method according to claim 1, wherein the generated transformed secure user authenticable authorization request is a user generated authentication token, based upon the PIE, the transaction token and the authentication parameter, and another authentication service comprises:

presenting, by the user, the user generated authentication token at the provider;

transmitting, by the provider, the user generated authentication token to the STS;

generating, by the STS, an STS-generated user authentication token, in response to receipt of the provider-submitted user generated authentication token;

verifying a match between the STS-generated user authentication token and the provider-submitted user generated authentication token; and authenticating, by the STS, the user for the provider, according to the verifying.

15. The computer system according to claim 1, wherein the generated transformed secure user authenticable authorization request is a user generated authentication token, based upon the PIE, the transaction token and the authentication parameter, and wherein the provider computer system provides another authentication service by:

requesting the user to present the user generated authentication token at the provider;

transmitting the user generated authentication token to the STS; and receiving an authentication result from the STS based upon verifying a match between the STS-generated user authentication token and the provider-submitted user generated authentication token.

16. A computer system, comprising:

a secure transaction server (STS) authenticating a mobile device communicably connectable to a wireless network by an authentication parameter as a mobile device authenticator, and providing a correlation between a personal identification entry (PIE) and the mobile device authenticator; and a provider computer system providing an authentication function upon a user attempting an access to the provider as an action with the provider, the provider including a physical environment, a computer system, or any combinations thereof, according to one or more authentication services including an authentication service of:

providing to the STS a provider authentication request, in response to the user attempted access to the provider computer system, receiving from the STS a transaction token, in response to the received provider authentication request, requesting a user to input the PIE and the transaction token, to the mobile device authenticator to transmit a transformed secure user authenticable authorization request to the STS over the wireless network as a user authorization of the action with the provider, based upon the PIE, the transaction token and the authentication parameter, receiving from the STS a user authentication result, based upon verifying, by the STS, the provider authentication request and the user authorization to access the provider, and authorizing the user access to the provider computer system, according to the user authentication result received from the STS.

17. The computer system according to claim 16, wherein the authentication service further includes prompting the user to submit a single manipulation action request to the provider computer system as the user attempted access to the provider computer system.

18. The computer system according to claim 16, wherein the mobile device authenticator is a mobile phone communicably connectable with a mobile phone network, wireless Internet, or any combinations thereof, as the wireless network, and the authentication service of the provider computer system further comprises:

associating, by the provider computer system, a user password and username for accessing the computer system with a mobile phone number of the mobile phone, and prompting the user to input only the mobile phone number at the provider computer system in the attempted access to the provider computer system.

19. The computer system according to claim 16, wherein the provider computer system provides another authentication service comprising:

providing a login function to the provider computer system using a username and password in place of transmitting the transaction token, and authorizing the action with the provider based upon the user inputting the PIE and the provider action, to the mobile device authenticator to transmit the transformed secure user authenticable authorization request to the STS over the wireless network.

20. The computer system according to claim 16, wherein the transformed secure user authenticable authorization request is a time-dependent and authentication parameter dependent user key, and the provider computer system provides another authentication service by:

requesting the user to present the user key to the provider;

transmitting the user key to the STS; and receiving an authentication result from the STS based upon verifying a match between an STS-generated user key for a current time and the transmitted provider-submitted user key.

* * * * *

UNITED STATES PATENT AND TRADEMARK OFFICE
CERTIFICATE OF CORRECTION

PATENT NO. : 7,606,560 B2  Page 1 of 1
APPLICATION NO. : 11/388202
DATED : October 20, 2009
INVENTOR(S) : Yannis Labrou et al.

It is certified that error appears in the above-identified patent and that said Letters Patent is hereby corrected as shown below:

Title Page, Item [75] (Inventors), Line 2, change "Brinkley," to --Brinklow,--.

Column 24, Line 63 Claim 13, after "service" delete "further".

Signed and Sealed this

Twelfth Day of January, 2010

David J. Kappos
*Director of the United States Patent and Trademark Office*